US012710385B2

(12) United States Patent
Meier et al.

(10) Patent No.: US 12,710,385 B2
(45) Date of Patent: Aug. 18, 2026

(54) METAL-LINED PACKAGE CAVITY FOR FLUID SENSORS

(71) Applicant: TEXAS INSTRUMENTS INCORPORATED, Dallas, TX (US)

(72) Inventors: Sebastian Meier, Munich (DE); Rujuta Munje, McKinney, TX (US); Tobias Bernhard Fritz, Mainburg (DE); Sreenivasan Kalyani Koduri, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 413 days.

(21) Appl. No.: 18/459,056

(22) Filed: Aug. 31, 2023

(65) Prior Publication Data

US 2025/0076093 A1 Mar. 6, 2025

(51) Int. Cl.
*G01N 27/07* (2006.01)
*G01N 27/414* (2006.01)

(52) U.S. Cl.
CPC ........... *G01N 27/07* (2013.01); *G01N 27/414* (2013.01)

(58) Field of Classification Search
CPC ...... G01N 27/07; G01N 27/12; G01N 27/121; G01N 27/128; G01N 27/414; G01N 27/4167
See application file for complete search history.

(56) References Cited

U.S. PATENT DOCUMENTS 5,833,824 A * 11/1998 Benton ................ G01N 27/414 204/417
2004/0183561 A1* 9/2004 Takekoshi .......... G01R 31/2865 324/750.03
2022/0155109 A1 5/2022 Koduri et al.

* cited by examiner

*Primary Examiner* — Paul M. West
(74) *Attorney, Agent, or Firm* — Zhenhai Fu; Frank D. Cimino

(57) ABSTRACT

In examples, a sensing device comprises a semiconductor die including a device side and a fluid sensor in the device side. The device comprises a metal ring forming an opening over the fluid sensor, the metal ring having a top surface, a bottom surface, and an inner surface extending between the top surface and the bottom surface, and the bottom surface being on the device side. At least a portion of the inner surface abuts the device side being plated with a noble metal. The device includes a mold compound covering the semiconductor die and a first portion of the metal ring, in which a second portion of the metal ring having the top surface protrudes out of the mold compound and provides at least one of a cartridge interface or a tube interface.

26 Claims, 20 Drawing Sheets

METAL-LINED PACKAGE CAVITY FOR FLUID SENSORS

BACKGROUND

Integrated circuits (ICs) are formed on semiconductor dies, which are subsequently packaged inside mold compounds to protect the semiconductor dies from damage caused by external elements, such as moisture, heat, and blunt force. The semiconductor die may also be coupled to a package substrate, such as a lead frame including conductive terminals, to facilitate communication with electronics external to the package. Parts of the conductive terminals are covered by the mold compound, while parts of the conductive terminals are exposed. By coupling the exposed parts of the conductive terminals to electronics external to the mold compound, a pathway is provided to exchange electrical signals between the electrical circuit within the package and electronics external to the package via the conductive terminals. Some packaged sensor devices, or sensor packages, may include ICs including fluid sensors formed on semiconductor dies, where the fluid sensors can be partially covered by mold compounds.

SUMMARY

In examples, a sensing device comprises a semiconductor die including a device side and a fluid sensor in the device side. The device comprises a metal ring forming an opening over the fluid sensor, the metal ring having a top surface, a bottom surface, and an inner surface extending between the top surface and the bottom surface, and the bottom surface being on the device side. At least a portion of the inner surface abuts the device side being plated with a noble metal. The device includes a mold compound covering the semiconductor die and a first portion of the metal ring, in which a second portion of the metal ring having the top surface protrudes out of the mold compound and provides at least one of a cartridge interface or a tube interface.

In examples, a method for manufacturing a sensing device comprises depositing a photoresist layer on a first surface of a semiconductor die, the first surface including a sensor. The method comprises exposing and developing the photoresist layer to produce a central photoresist member, a ring-shaped photoresist member surrounding the central photoresist member, and a ring-shaped cavity between the central photoresist member and the ring-shaped photoresist member. The central photoresist member contacts the sensor. The method comprises plating a metal ring in the ring-shaped cavity, with the metal ring including a first portion having a first lateral thickness and a second portion having a variable lateral thickness. The method comprises removing the central photoresist member and the ring-shaped photoresist member. The method comprises plating a noble metal on at least an inner surface of the metal ring abutting the first surface. The method comprises applying a mold compound to the surface and to the metal ring, with a top surface of the metal ring at least partially exposed through the mold compound.

DETAILED DESCRIPTION

Some types of sensors are configured to measure various physical properties of an environment, such as temperature, humidity, light, sound, pressure, etc. The sensor can be formed on a semiconductor die, which can be partially encapsulated in a mold compound to form a sensor package. In some cases, the sensor can be exposed directly via an opening in the mold compound to the environment to be tested.

Various factors can limit the performance of a sensor package. For example, the mold compound may have a single opening to expose the sensor to the external environment. In a case of a fluid sensor, the sensor can be exposed to and measure the properties of one fluid through the single opening at a time. But additional fluids cannot be provided to the sensor at the same time for measurement. Instead, if multiple fluids are to be tested, the fluids are tested sequentially. This is a significant limitation on operational efficiency. Also, the sensor package may include metal components that are exposed to the fluid to be measured or other external elements. The metal components may be prone to corrosion, which can affect the structural or functional integrity of the sensor package. The metal components may also have chemical reaction with the fluid to be measured and may contaminate the fluid or at least affect the accuracy of the measurement. All these can degrade the performance of the sensor package and are undesirable.

Various examples of sensor packages as to be described herein can address at least some of challenges described above. More specifically, the sensor packages described herein include multiple sensors positioned within cavities that are lined by plated metal rings. The metal rings are configured to interface with different structures that provide to the sensors fluids, gases, or other materials to be tested. Such structures can include cartridges and tubes. The cartridges and tubes deliver testing materials (e.g., fluids, gases) directly to intended sensors and prevent the testing materials from reaching unintended areas, such as other sensors. Accordingly, a single package can include any number of sensors, each configured to receive its own testing material through pipes, cartridges, and other such structures. Further, the metal rings may be plated with metals that prevent corrosion by exposure to testing materials (e.g., fluids). Examples of these sensor packages are now described with reference to the drawings.

Figure 1:
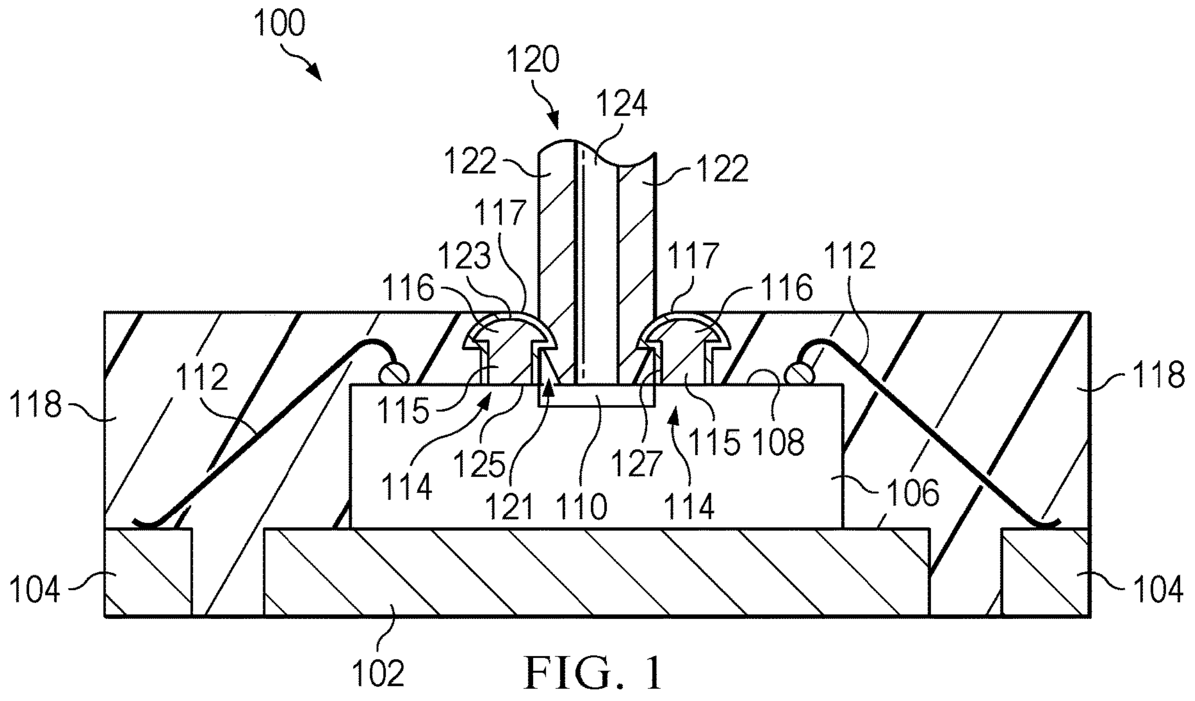
FIG. 1 is a schematic illustrating a profile, cross-sectional view of a packaged sensor coupled to a tube, in accordance with various examples.

FIG. 1 is a profile, cross-sectional view of a sensor package 100 having a metal ring to interface with a tube, in accordance with various examples. The tube can provide a testing material, such as a fluid, to a sensor in the sensor package 100. The sensor package 100 may include a die pad 102 and conductive terminals 104 (e.g., leads) exposed to an exterior surface of the sensor package 100. The sensor package 100 may include a semiconductor die 106, such as a silicon die, coupled to the die pad 102. The die 106 has a device side 108 in which circuitry is formed. For example, circuitry configured to process signals from a sensor 110 may be formed in the device side 108. The sensor 110 may also be positioned in the device side 108, and the sensor 110 may be configured to sense any of a variety of properties of any of a variety of materials (e.g., temperature, viscosity, chemical composition, humidity, light, sound, pressure of gases, liquids, ambient conditions, etc.). In examples, the sensor 110 is an ion-sensitive field effect transistor (ISFET). The scope of this description is not limited to any particular type of sensor 110.

Wirebonds 112 are coupled to the device side 108 (e.g., to contact pads on the device side 108) and to conductive terminals 104, thereby establishing a communication pathway between the die 106 and devices outside of the sensor package 100. A metal ring 114 (e.g., copper) forming an opening 121 around a periphery of the sensor 110. The metal ring 114 may have a cross-section that includes a portion 115 and a portion 116 above (e.g., more distal from the sensor 110) the portion 115. In examples, the portion 115 has a substantially uniform lateral thickness (e.g., a thickness along an axis parallel to device side 108), where this thickness may not extend beyond a range of plus or minus, for example, 10% from a baseline thickness. The portion 116 has a lateral thickness that varies, with a greatest lateral thickness near the bottom (e.g., most proximal to the sensor 110) of the portion 116, and a least lateral thickness near the top (e.g., most distal to the sensor 110) of the portion 116. The lateral thickness of the portion 116 varies to include thicknesses that are less than the lateral thickness of the portion 115 and thicknesses that are greater than the lateral thickness of the portion 115. The metal ring 114 can provide an interface to couple with a tube, such as tube 120. The increased lateral thickness of portion 116 can provide a protruded structure (e.g., a hook structure) to facilitate coupling between the tube 120 and the metal ring and to avoid detachment of the tube 120 from the metal ring 114.

The metal ring 114 is plated with a noble metal 117 (e.g., gold, palladium, silver, platinum, or other noble metals, or a stack of metals such as nickel/gold or nickel/palladium/gold). The metal ring 114 has a top surface 123, a bottom surface 125, and an inner surface 127 extending between the top surface 123 and the bottom surface 125. The bottom surface 125 of the metal ring 114 is coupled to the device side 108 and thus is not plated, but in some examples, the remaining surfaces of the metal ring 114, including at least a part of inner surface 123 abutting device side 108 is plated with the noble metal 117, and in other examples, the surfaces of the metal ring 114 not covered by mold compound 118 and not coupled to the device side 108 are plated with the noble metal 117. Such arrangements can ensure metal ring 114 does not react with and contaminate a test material (e.g., a fluid) that may remain at the base of metal ring 114 and in physical contact with sensor 110 for an extended period of time, which can improve the accuracy of sensor 110 in measuring the test material. The mold compound 118 covers various components of the sensor package 100 as shown and protects them from external damage, such as by impact, moisture, temperature fluctuations, etc. Also, part of portion 116 (and top surface 123) protrudes out of and exposed in mold compound 118. Such arrangements can prevent the mold compound 118 from entering the opening 121 during the molding operation.

Figure 2:
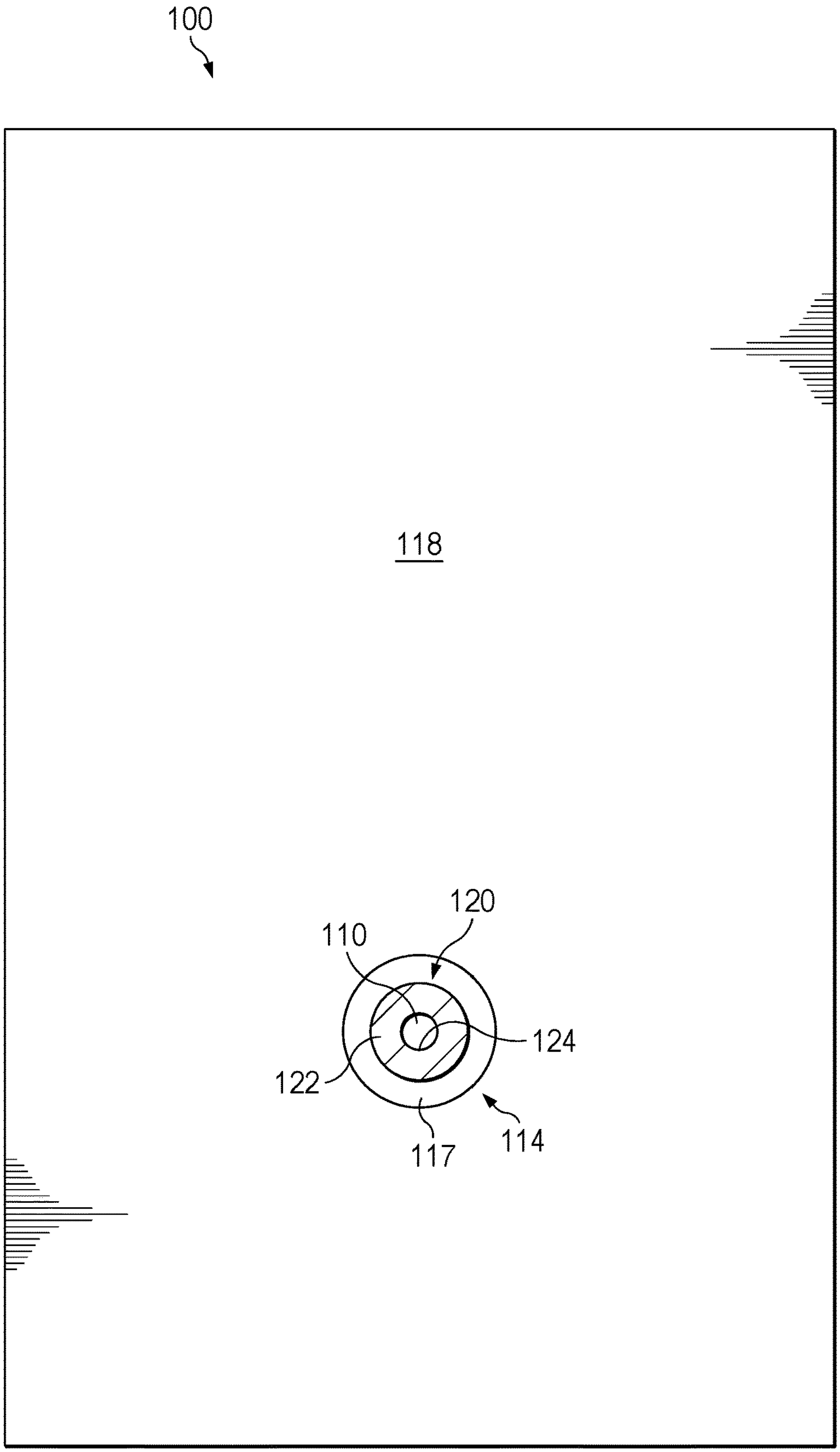
FIG. 2 is a schematic illustrating a top-down view of the sensor package and the tube of FIG. 1, in accordance with various examples.

In examples, the tube 120 includes a solid portion 122 and a hollow portion 124 (e.g., a lumen) encircled by the solid portion 122. The end of the tube 120 that is coupled to the metal ring 114 may have a shape that facilitates such coupling and that prevents the tube 120 from becoming uncoupled from the metal ring 114. For example, the end of the tube 120 coupled to the metal ring 114 may include plastic prong(s) that enable the tube 120 to snap into place, force fit features, or any other suitable mechanism for coupling with the metal ring 114 and mitigating the risk of subsequent detachment from the metal ring 114. Further, as described, the metal ring 114 has varying lateral thicknesses (e.g., a portion 115 with a smaller lateral thickness relative to the portion 116) that enable the metal ring 114 to retain the tube 120 after insertion. Once coupled to the metal ring 114, the tube 120 provides testing material (e.g., fluids, gases) to the sensor 1 e.g., more distal from the sensor 110) 10, as shown. Similarly, the tube 120 may provide a pathway for the testing material to be removed from the sensor 110. In some examples, the tube 120 includes multiple lumens, one for providing testing material to the sensor 110 and one for removing the testing material from the sensor 110. Any and all such variations are contemplated and included in the scope of this description. In addition to coupling to the tube 120, the metal ring 114 also mitigates the risk of fluid seepage into other parts of the sensor package 100, such as into the mold compound 118. The noble metal 117 on the metal ring 114 mitigates corrosion or other wear of the metal ring 114 by fluids, exposure to oxygen, etc. FIG. 2 is a top-down view of the structure of FIG. 1, in accordance with various examples.

In some examples, instead of or in lieu of the wirebonds 112, the sensor package 100 may include flip-chip connections to provide electrical connections between the die 106 and devices external to the sensor package. Sensor packages that include both flip-chip connections as well as wirebond connections are also contemplated and included in the scope of this description.

Figure 3:
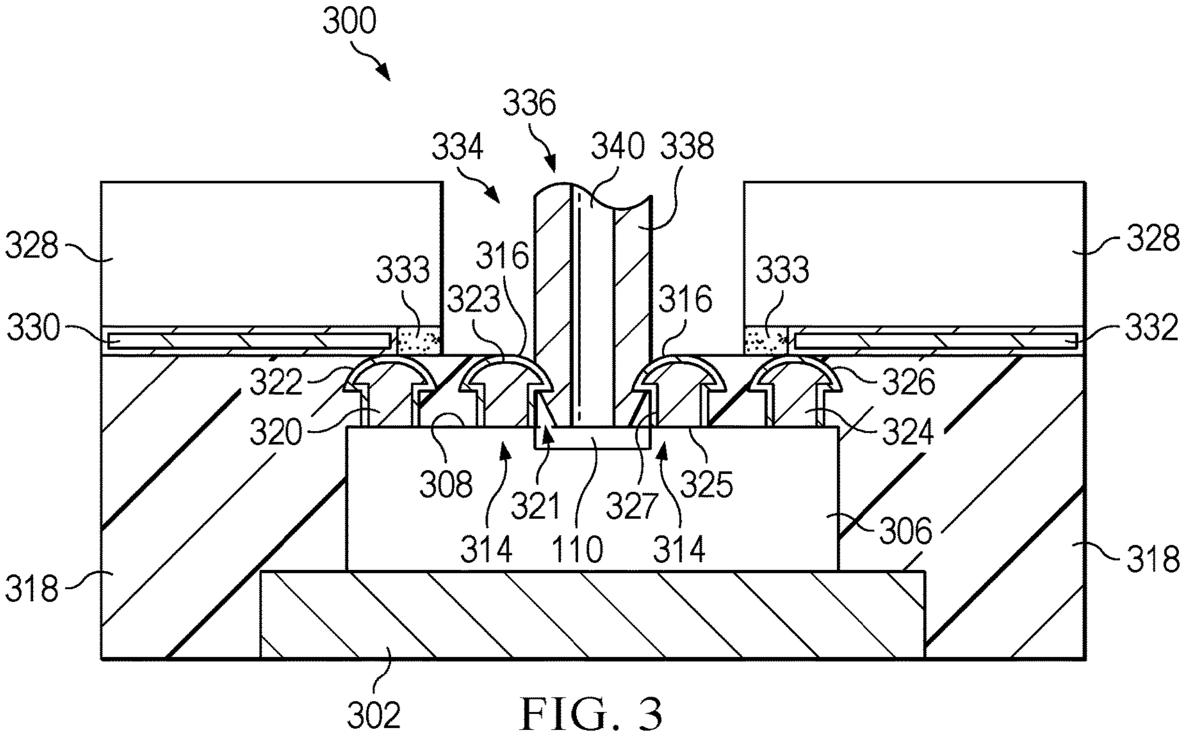
FIG. 3 is a schematic illustrating a profile, cross-sectional view of a sensor package coupled to a substrate, in accordance with various examples.

FIG. 3 is a profile, cross-sectional view of a sensor package 300 having such a flip-chip configuration, in accordance with various examples. The sensor package 300 includes a die pad 302 coupled to a semiconductor die 306. The die 306 has a device side 308 in which circuitry is formed. The sensor package 300 includes a sensor 310 positioned within the device side 308. The sensor 310 may be similar in function to the sensor 110, described above. The sensor package 300 includes a metal ring 314 (e.g., copper) coupled to the device side 308. A mold compound 318 covers the various structures of the package 300, as shown. The metal ring 314 forms an opening 321 around a periphery of the sensor 310. The metal ring 314 is plated with a noble metal 316 (e.g., gold, palladium, silver, platinum, or other noble metals, or a stack of metals such as nickel/gold or nickel/palladium/gold). The metal ring 314 has a top surface 323, a bottom surface 325, and an inner surface 327 extending between the top surface 323 and the bottom surface 325. The bottom surface 325 of the metal ring 314 is coupled to the device side 308 and thus is not plated, but in some examples, the remaining surfaces of the metal ring 314, including at least a part of inner surface 327 abutting device side 308 is plated with the noble metal 316, and in other examples, the surfaces of the metal ring 314 not covered by mold compound 318 and not coupled to the device side 308 are plated with the noble metal 316. The dimensions, properties, and functions of the metal ring 314 are similar to those of the metal ring 114, described above, and thus are not repeated in detail here.

The sensor package 300 may further include a metal post 320 (e.g., copper) that is plated with a plated metal 322 (e.g., a noble metal such as gold), and a metal post 324 (e.g., copper) that is plated with a plated metal 326 (e.g., a noble metal such as gold). The metal posts can provide flip-chip connection (or other types of electrical connections) to an external component of the sensor package.

In some examples, the metal posts 320 and 324 are standalone posts, and can have a cross-sectional profile similar to metal ring 314. For example, each of the metal posts can have a top portion (e.g., more distal from the device side 308 and the sensor 310) and a bottom portion (e.g., more proximate to the device side 308 and the sensor 310), where the bottom portion has a substantially uniform width and the top portion has a non-uniform width. In some examples, the top portion can have a greatest width near the bottom (e.g., most proximal to the sensor 310), and a least width near the top (e.g., most distal to the sensor 310). Such arrangement can increase the surface areas of the metal posts for forming the electrical connections (e.g., for soldering) with the external component.

Figure 4:
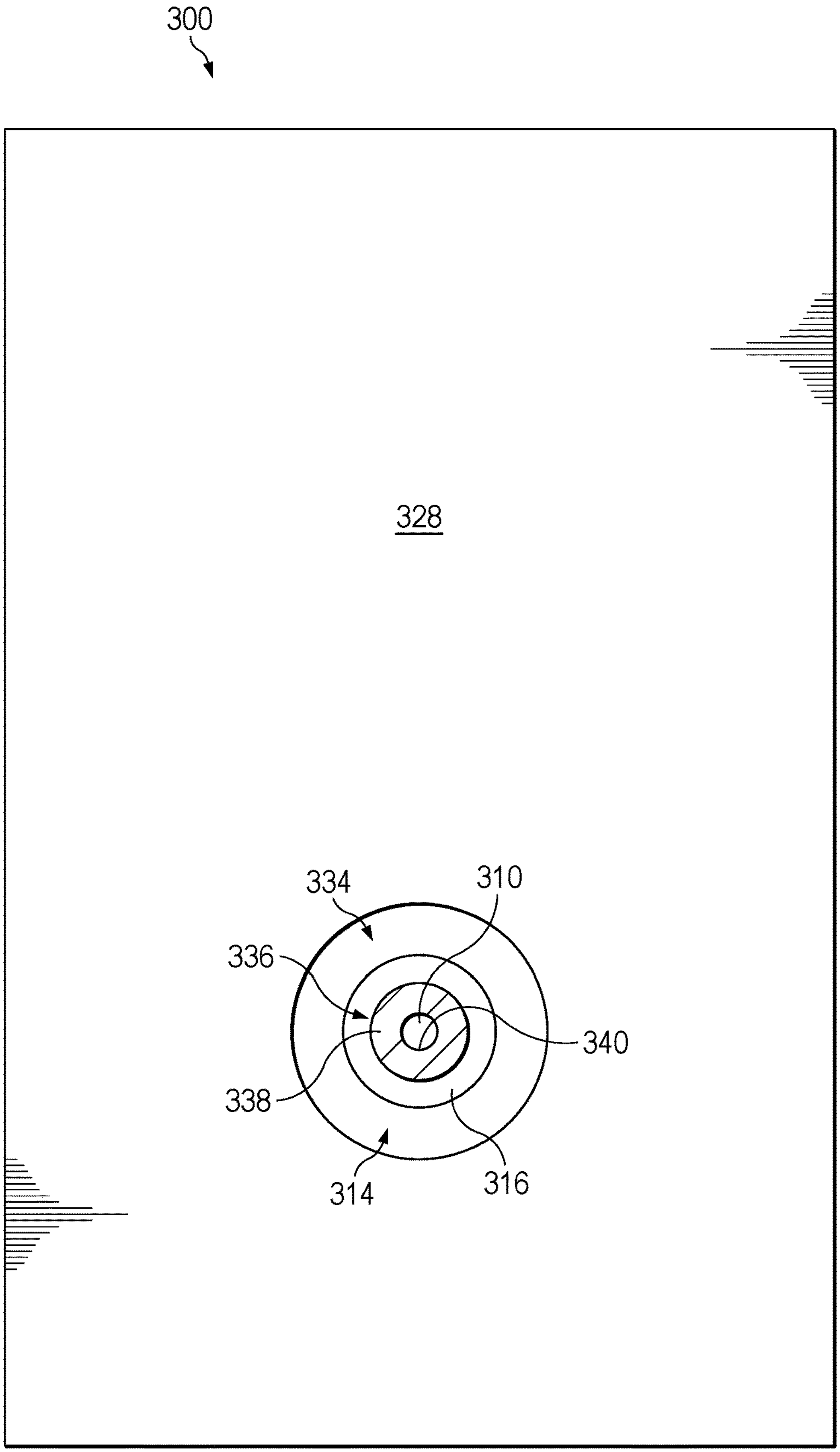
FIG. 4 is a schematic illustrating a top-down view of the sensor package and the substrate of FIG. 3, in accordance with various examples.

In the example of FIG. 3, the metal posts 320 and 324 can form electrical connections to a PCB 328, which includes metal traces 330 and 332 coupled to, respectively, the metal posts 320 and 324. More specifically, the metal post 320 is coupled to the metal trace 330, and the metal post 324 is coupled to the metal trace 332. In examples, the metal traces 330, 332 are copper traces that may be plated with a plated metal, such as a noble metal (e.g., gold). The metal posts 320, 324 may be coupled to the metal traces 330, 332 by way of any suitable technique, such as soldering, anisotropic conductive film (ACF), thermocompression bonding, etc. A non-conductive sealant material 333 (e.g., an elastomer material) may be positioned between the traces 330, 332 and a cavity 334 of the PCB 328. A tube 336 may extend through the cavity 334 and may be coupled to the metal ring 314. The tube 336 may include a solid portion 338 and a hollow portion 340 (e.g., a lumen) through which testing material may be provided to the sensor 310. The properties and operation of the tube 336 may be similar to those of the tube 120 and thus are not repeated in detail here. Data collected by the sensor 310 may be provided to circuitry in the die 306, and this circuitry may provide signals to the traces 330, 332 by way of metal posts 320, 324. Additional metal posts may be included. FIG. 4 is a top-down view of the structure of FIG. 3, in accordance with various examples.

Figure 5:
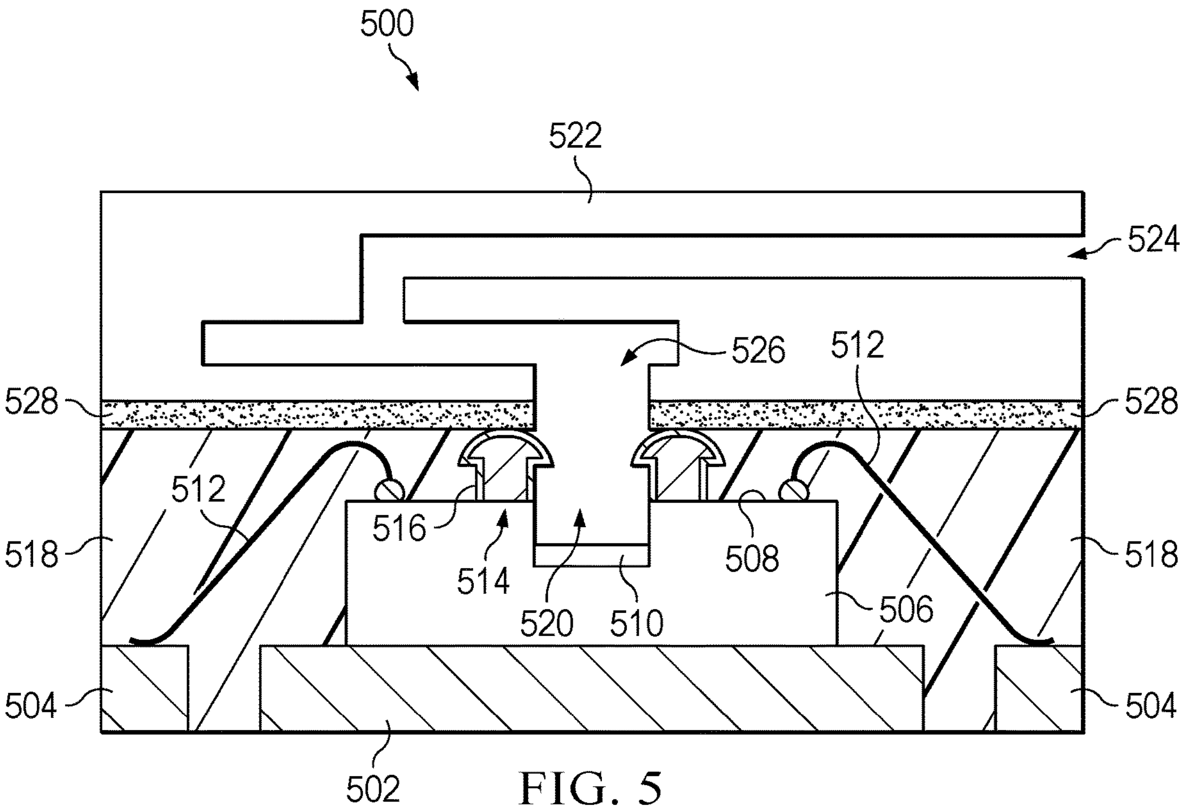
FIG. 5 is a schematic illustrating a profile, cross-sectional view of a sensor package coupled to a cartridge, in accordance with various examples.

In some examples, cartridges may be useful in lieu of tubes and PCBs to provide and retrieve testing material to and from the sensor package and to provide and retrieve data signals from the sensor package. FIG. 5 is a profile, cross-sectional view of a sensor package 500 configured to couple to such a cartridge, in accordance with various examples. The sensor package 500 includes a die pad 502 and conductive terminals 504 (e.g., leads). The sensor package 500 includes a semiconductor die 506 coupled to the die pad 502. A device side 508 of the die 506 includes circuitry configured to process signals provided by a sensor 510. The sensor 510 may be similar in function to the sensor 110, described above. Wirebonds 512 couple circuitry on the device side 508 (e.g., contact pads on the device side 508 that are coupled to circuitry) to the conductive terminals 504. A metal ring 514 (e.g., composed of copper) surrounds the sensor 510. In examples, the metal ring 514 is plated with a plated metal 516 (e.g., a noble metal such as gold). A mold compound 518 covers various structures of the sensor package 500, as shown. The plated metal 516 may cover all surfaces of the metal ring 514 except for that which is coupled to the device side 508. In other examples, the plated metal 516 covers only the surface of the metal ring 514 that is not covered by the mold compound 518 and that does not couple to the device side 508. The metal ring 514 surrounds the sensor 510 and a cavity 520. A cartridge 522 is positioned above the sensor package 500. The cartridge 522 may be composed of any suitable material. The cartridge 522 includes a fluidic channel 524 that terminates at a cavity 526. The cavities 520, 526 are aligned, as shown, to facilitate the exchange of testing material (e.g., fluids) between the fluidic channel 524 and the cavity 520 (e.g., the sensor 510). An adhesive 528 (e.g., two component epoxy or ultraviolet-cured adhesive) may couple the cartridge 522 to the mold compound 518. In examples, multiple adhesives may be useful. In examples, elastomer gaskets may be useful to form a seal between cartridge 522 and the plated metal 516. In operation, testing materials are provided to the sensor 510 via the fluidic channel 524 of the cartridge 522. The sensor 510 collects data about the properties of the testing materials, and circuitry in the die 506 processes this data. The circuitry may communicate with devices external to the sensor package 500 through the wirebonds 512 and conductive terminals 504. The properties and functionality of the metal ring 514 is similar to that of the metal ring 114 and thus is not described again here in detail.

Figure 6:
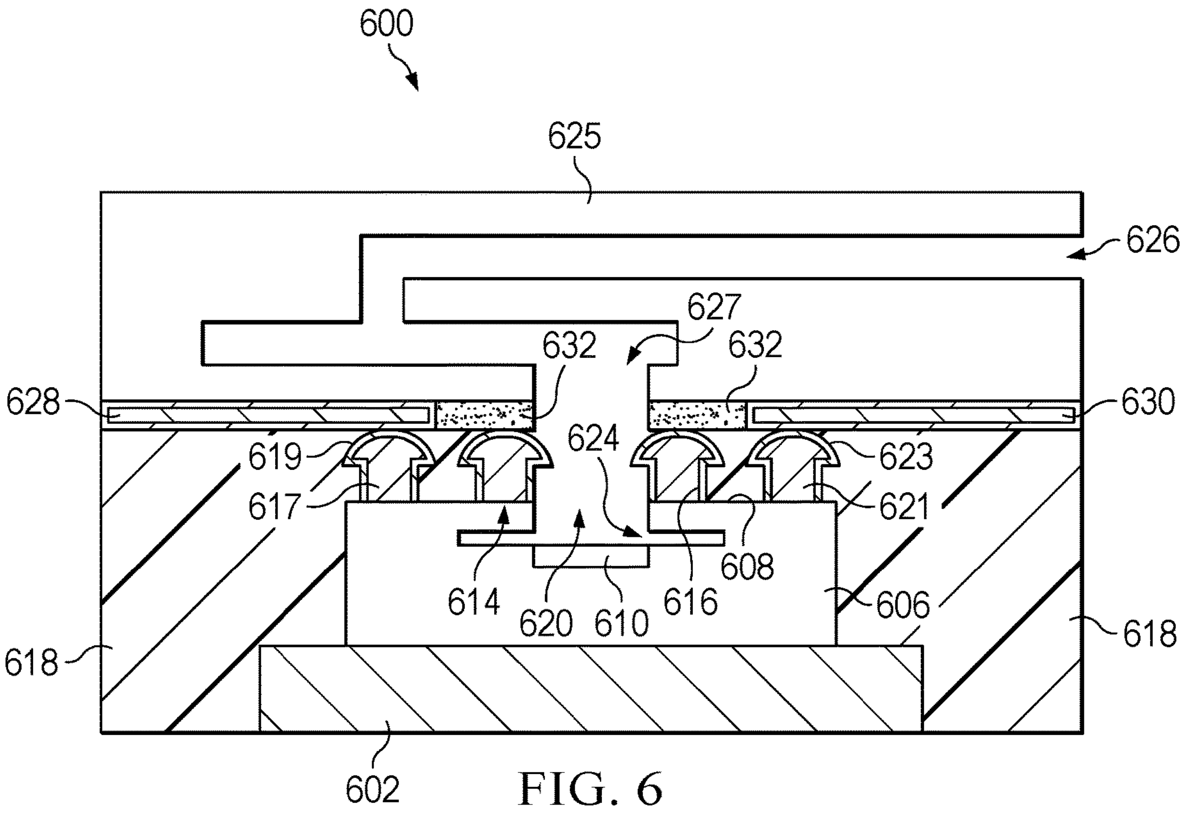
FIG. 6 is a schematic illustrating a profile, cross-sectional view of a sensor package coupled to a cartridge, in accordance with various examples.

In some examples, the wirebonds of the sensor package 500 may be replaced by metal traces formed on the cartridge. FIG. 6 is a profile, cross-sectional view of a sensor package 600 that is configured to couple to cartridges having such metal traces, in accordance with various examples. In examples, the sensor package 600 includes a die pad 602. The sensor package 600 includes a semiconductor die 606 coupled to the die pad 602. A device side 608 of the die 606 includes circuitry configured to process signals provided by a sensor 610. The sensor 610 may be similar in function to the sensor 110, described above. A metal ring 614 (e.g., composed of copper) surrounds the sensor 610. In examples, the metal ring 614 is plated with a noble metal 616 (e.g., gold, palladium, silver, platinum, or other noble metals, or a stack of metals such as nickel/gold or nickel/palladium/gold). A mold compound 618 covers various structures of the sensor package 600, as shown. The plated metal 616 may cover all surfaces of the metal ring 614 except for that which is coupled to the device side 608. In other examples, the plated metal 616 covers only the surface of the metal ring 614 that is not covered by the mold compound 618 and that does not couple to the device side 608. The sensor package 600 also includes a metal post 617 (e.g., copper) plated with a plated metal 619 (e.g., a noble metal such as gold) and a metal post 621 (e.g., copper) plated with a plated metal 623 (e.g., a noble metal such as gold). The metal posts 617, 621 can have similar structures and shapes as the metal posts 320 and 324 of FIG. 3.

The metal ring 614 surrounds the sensor 610 and a cavity 620. In some examples, microfluidic channels 624 extend laterally from the cavity 620, as shown. A cartridge 625 is positioned above the sensor package 600. The cartridge 625 may be composed of any suitable material. The cartridge 625 includes a fluidic channel 626 that terminates at a cavity 627. The cavities 620, 627 are aligned, as shown, to facilitate the exchange of testing material (e.g., fluids) between the fluidic channel 626 and the cavity 620 (e.g., the sensor 610). Metal traces 628, 630 (e.g., copper plated with a noble metal, such as gold) are formed on the cartridge 625 and are coupled to the metal posts 617, 621. The metal traces 628, 630 may be coupled to other circuitry, traces, solder bumps, etc., that are not expressly shown. Signals may be exchanged between the circuitry on the die 606 and devices or circuitry coupled to the metal traces 628, 630 by way of the metal posts 617, 621 and the metal traces 628, 630. An adhesive 632 (e.g., anisotropic conductive film (ACF)) may couple the cartridge 625 to the mold compound 618. In examples, multiple adhesives may be useful. In examples, the metal traces 628, 630 may be coupled to the metal posts 617, 621, respectively by a suitable adhesive, such as solder or ACF.

In operation, testing materials are provided to the sensor 610 via the fluidic channel 626 of the cartridge 625. The sensor 610 collects data about the properties of the testing materials, and circuitry in the die 606 processes this data. The circuitry may communicate with devices external to the sensor package 600 through the metal posts 617, 621 and the metal traces 628, 630.

Figure 7:
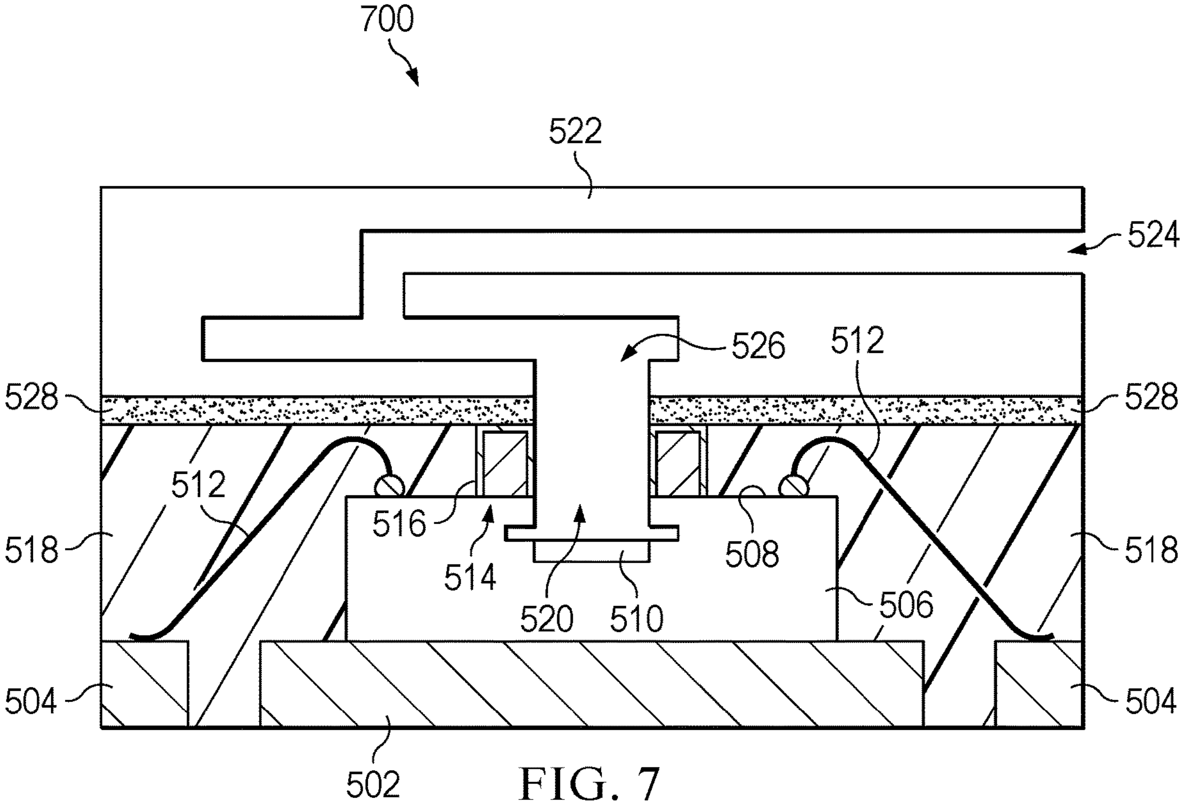
FIG. 7 is a schematic illustrating a profile, cross-sectional view of a sensor package coupled to a cartridge, in accordance with various examples.
Figure 8:
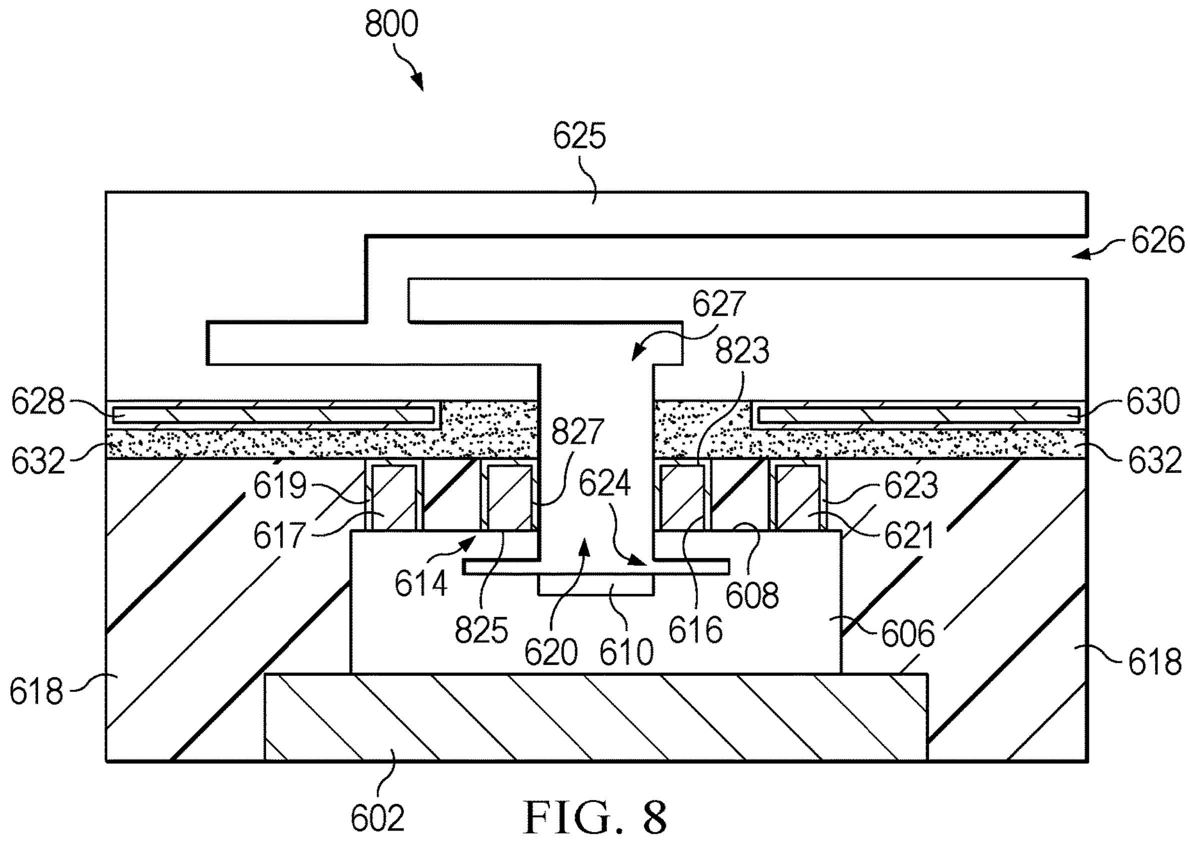
FIG. 8 is a schematic illustrating a profile, cross-sectional view of a sensor package coupled to a cartridge having electronic circuitry, in accordance with various examples.

In some examples, the metal rings and metal posts may have different shapes than those described above. For example, each metal ring may have a uniform lateral thickness throughout its height. Similarly, each metal post may have a uniform lateral thickness throughout its height. FIGS. 7 and 8 show variations of the structures of FIGS. 5 and 6, respectively, that include metal rings and metal posts with such uniform lateral thicknesses. Specifically, FIG. 7 is a profile, cross-sectional view of a sensor package 700 coupled to a cartridge that is configured to provide a package sensor with a testing material, in accordance with various examples. The structures of FIG. 7 are identical to those of FIG. 5, except that the metal ring 514 has a uniform lateral thickness throughout its height. FIG. 8 is a profile, cross-sectional view of a sensor package 800 coupled to a cartridge that is configured to provide a package sensor with a testing material and that is configured to exchange data signals with the sensor package, in accordance with various examples. The structures of FIG. 8 are identical to those of FIG. 6, except that the metal ring 614, as well as each of the metal posts 617 and 621, have uniform lateral thicknesses throughout their respective heights.

In the example of FIG. 8, the metal ring 614 has a top surface 823, a bottom surface 825, and an inner surface 827 extending between the top surface 823 and the bottom surface 825. The bottom surface 825 of the metal ring 614 is coupled to the device side 608 and thus is not plated, but in some examples, the remaining surfaces of the metal ring 614, including at least a part of inner surface 827 abutting the device side 608 is plated with the noble metal 616, and in other examples, the surfaces of the metal ring 614 not covered by mold compound 618 and not coupled to the device side 608 are plated with the noble metal 616.

Further, in some examples, the sensor package 800 includes the adhesive 632 in a different configuration than shown in FIG. 6. In this configuration, the adhesive 632 may be ACF, in which case current may flow vertically between metal post 617 and metal trace 628, but not horizontally between metal post 617 and fluid flowing through cavity 627. Similarly, the adhesive 632 (e.g., ACF) may facilitate current flow vertically between metal post 621 and metal trace 630, but not horizontally between metal post 621 and fluid flowing through cavity 627. Similarly, adhesive 632 blocks horizontal current flow between metal posts 614, 616 and the fluid flowing through the cavity 627.

Figure 9:
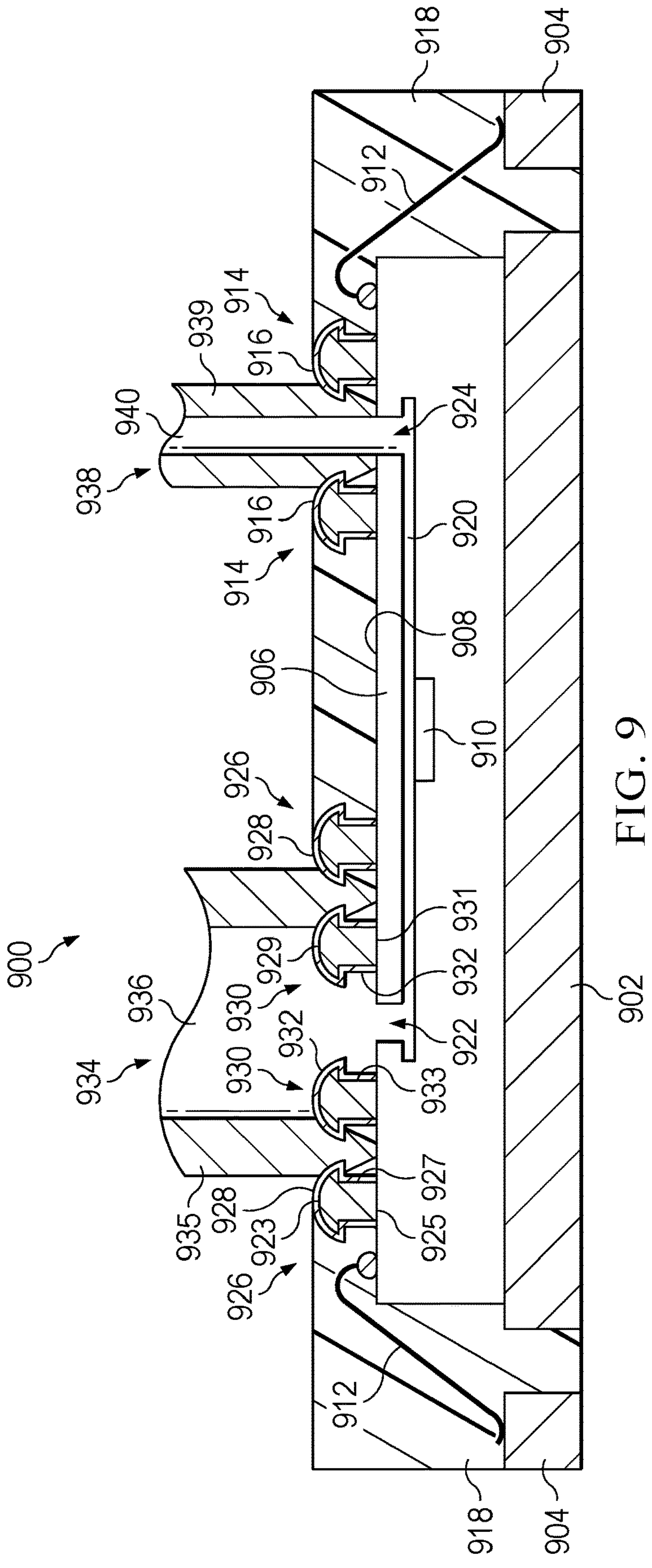
FIG. 9 is a schematic illustrating a profile, cross-sectional view of a sensor package coupled to multiple tubes, in accordance with various examples.

FIG. 9 is a profile, cross-sectional view of a sensor package 900 having a microfluidic channel configured to provide testing materials between first and second tubes coupled to metal rings of the sensor package, in accordance with various examples. Specifically, the sensor package 900 includes a die pad 902 and conductive terminals 904 (e.g., leads). The sensor package 900 includes a die 906 having a device side 908 in which circuitry is formed. The sensor package 900 includes a sensor 910, which has properties similar to the sensor 110 described above that are not repeated here. Wirebonds 912 couple contact pads on the device side 908 to the conductive terminals 904.

The sensor package 900 includes a metal ring 914 (e.g., copper) having been plated with a plated metal 916 (e.g., a noble metal such as gold). The properties of the metal ring 914 are similar to those of the metal ring 114 described above and thus are not repeated here. The sensor package 900 may also include a mold compound 918 covering various structures of the sensor package 900, as shown. A microfluidic channel 920 fluidically connects a cavity 922 and a cavity 924, with the sensor 910 exposed to the microfluidic channel 920. Thus, the sensor 910 is configured to assess properties of testing materials that may flow through the microfluidic channel 920 between the cavities 922 and 924. The metal ring 914 surrounds the cavity 924, and a metal ring 926 (e.g., copper) surrounds the cavity 922. The metal ring 926 is plated with a noble metal 928 (e.g., gold, silver, platinum, or other noble metals, or a stack of metals such as nickel/gold or nickel/palladium/gold). A metal ring 930 (e.g., copper) also surrounds the cavity 922 and is positioned between the cavity 922 and the metal ring 926. The metal ring 930 is plated with a noble metal 932 (e.g., gold, silver, platinum, or other noble metals, or a stack of metals such as nickel/gold or nickel/palladium/gold).

In the example of FIG. 9, the metal ring 926 has a top surface 923, a bottom surface 925, and an inner surface 927 extending between the top surface 923 and the bottom surface 925. The bottom surface 925 of the metal ring 926 is coupled to the device side 908 and thus is not plated, but in some examples, the remaining surfaces of the metal ring 926, including at least a part of inner surface 927 abutting the device side 908 is plated with the noble metal 928, and in other examples, the surfaces of the metal ring 926 not covered by mold compound 918 and not coupled to the device side 908 are plated with the noble metal 928.

In the example of FIG. 9, the metal ring 930 has a top surface 929, a bottom surface 931, and an inner surface 933 extending between the top surface 929 and the bottom surface 931. The bottom surface 931 of the metal ring 930 is coupled to the device side 908 and thus is not plated, but in some examples, the remaining surfaces of the metal ring 930, including at least a part of inner surface 933 abutting the device side 908 is plated with the noble metal 932, and in other examples, the surfaces of the metal ring 930 not covered by mold compound 918 and not coupled to the device side 908 are plated with the noble metal 932.

Figure 10:
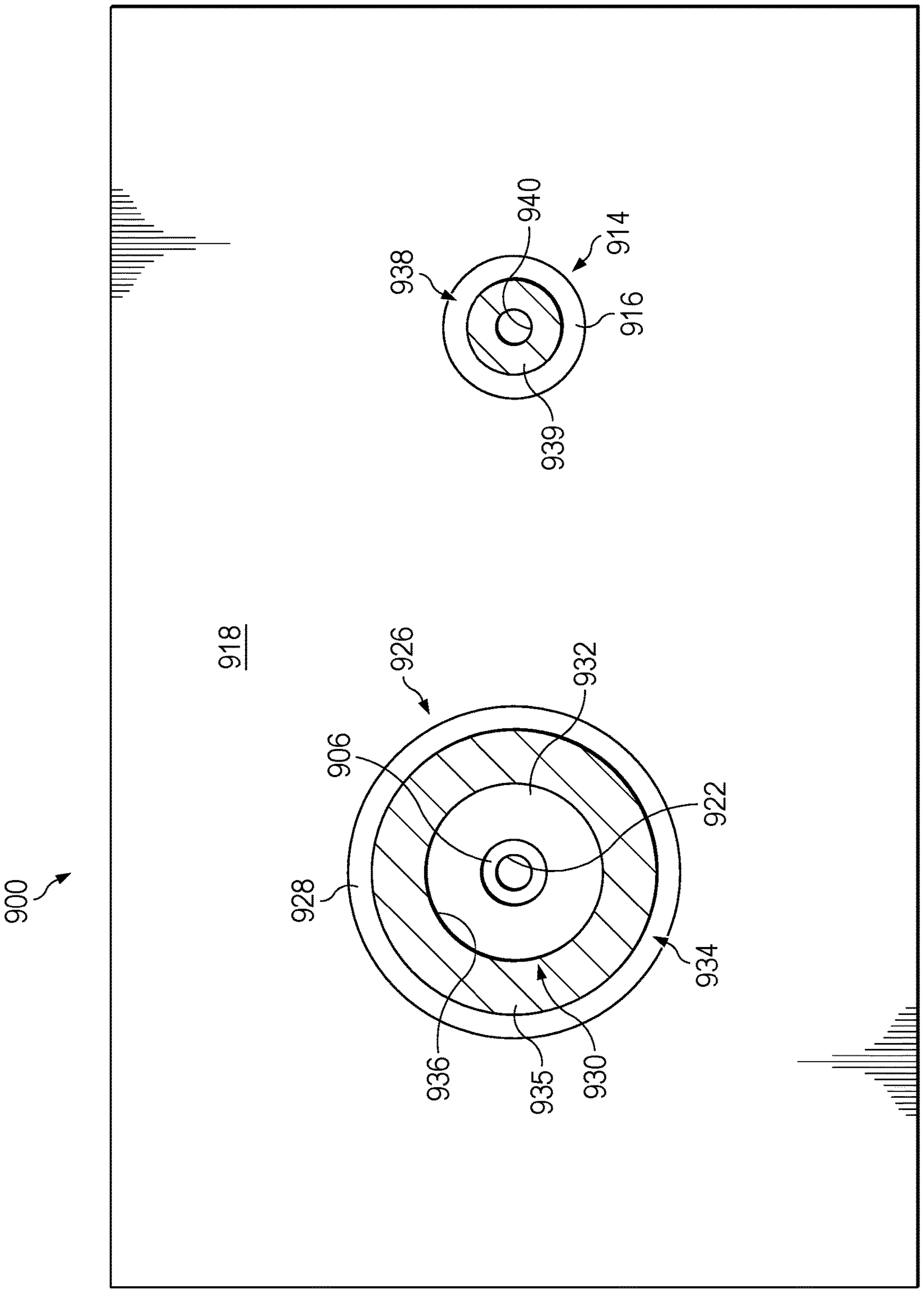
FIG. 10 is a schematic illustrating a top-down view of the sensor package and the multiple tubes, in accordance with various examples.

The metal rings 926, 930 are configured to be coupled to a tube 934 that has a solid portion 935 and a hollow portion 936 (e.g., a lumen). In some examples, the ends of tube 934 most proximal to the sensor package 900 may be shaped to "snap" and lock in between the metal rings 926, 930. In examples, the tube 934 and/or the sensor package 900 may be heated when the tube 934 is coupled to the sensor package 900, and thus the tube 934 may change its shape or may melt to fuse with the metal rings 926, 930. When cooled, the risk of decoupling the tube 934 from the sensor package 900 may be mitigated. The end of the solid portion 935 that is coupled to the metal rings 926, 930 may be shaped to couple to the metal rings 926, 930, such as with plastic prong(s) that allow the tube 934 to snap into place, force fit features, etc. Similarly, a tube 938 including a solid portion 939 and a hollow portion 940 (e.g., a lumen) may be coupled to the metal ring 914, and the end of the solid portion 939 that is coupled to the metal ring 914 may be shaped to include plastic prong(s) that allow the tube 938 to snap into place, force fit features, etc. that facilitate coupling to the metal ring 914. In operation, testing material (e.g., fluids) flows through one of the tubes 934, 938, into the microfluidic channel 920, across sensor 910, and out the other tube 934, 938. FIG. 10 is a top-down view of the structure of FIG. 9, in accordance with various examples.

Figure 11:
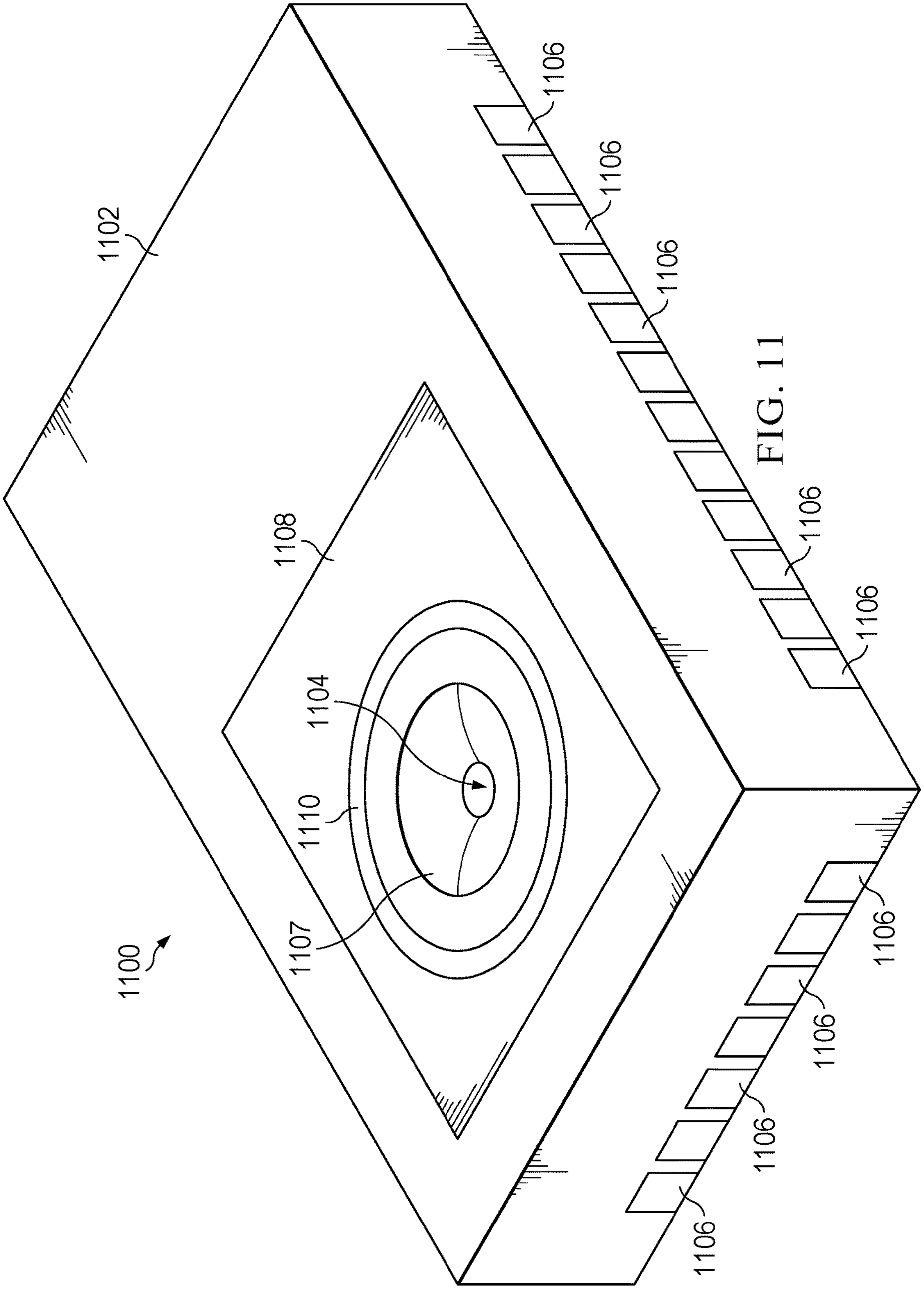
FIG. 11 is a schematic illustrating a perspective view of a sensor package, in accordance with various examples.
Figure 12:
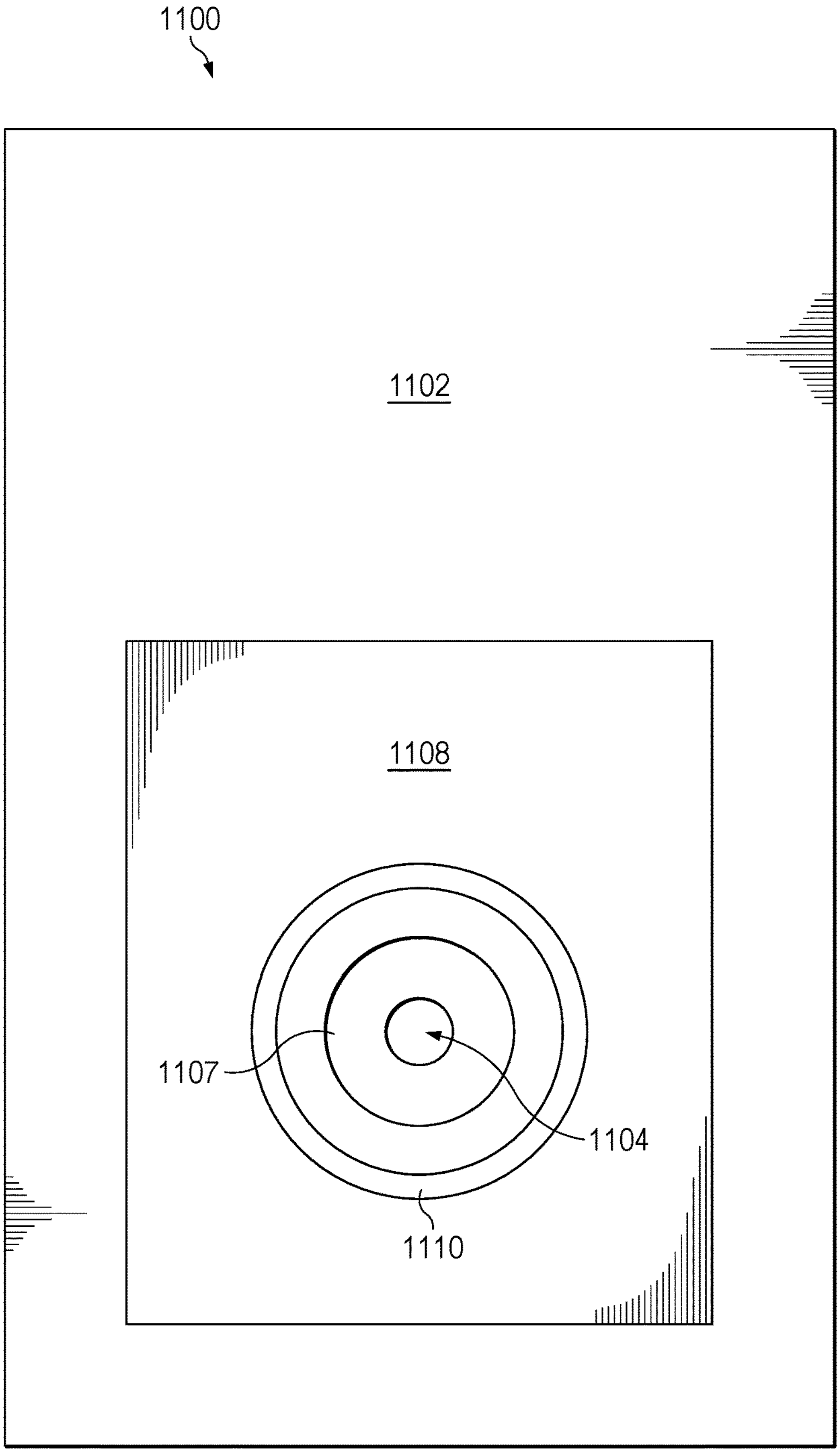
FIG. 12 is a schematic illustrating a top-down view of the sensor package of FIG. 11, in accordance with various examples.

FIG. 11 is a perspective view of a sensor package 1100 having a plated sealing surface and a plated metal ring surrounding a sensor, in accordance with various examples. In examples, the sensor package 1100 includes a mold compound 1102, a sensor 1104 that is coupled to a semiconductor die (not expressly shown) within the sensor package 1100, and conductive terminals 1106 (e.g., leads) that are also coupled to the semiconductor die within the sensor package 1100. The sensor 1104 may be similar to the sensor 110 and thus is not described in detail here. The sensor package 1100 includes a plated metal ring 1107 (e.g., composed of copper and plated with a noble metal, such as gold). The plated metal ring 1107 surrounds the sensor 1104. A plated area 1108 (e.g., a noble metal, such as gold) may be located on a top surface of the mold compound 1102 and may be contiguous with the plated metal ring 1107. The sensor package 1100 may include an o-ring 1110 positioned on the plated area 1108 and encircling the sensor 1104. The o-ring 1110 facilitates coupling with a structure, such as a cartridge, that may provide and/or retrieve testing materials (e.g., fluid) from the sensor 1104, and further because the o-ring 1110 helps facilitate a strong seal to mitigate the risk of testing material leaks into areas of the sensor package 1100 susceptible to damage. The plated area 1108 is beneficial because it prevents any testing material (e.g., fluid) that has escaped from within the confines of the o-ring 1110 from damaging other parts of the sensor package 1100 (e.g., by seeping into the porous top surface of the mold compound 1102). FIG. 12 is a top-down view of the sensor package 1100, in accordance with various examples.

Figure 13A:
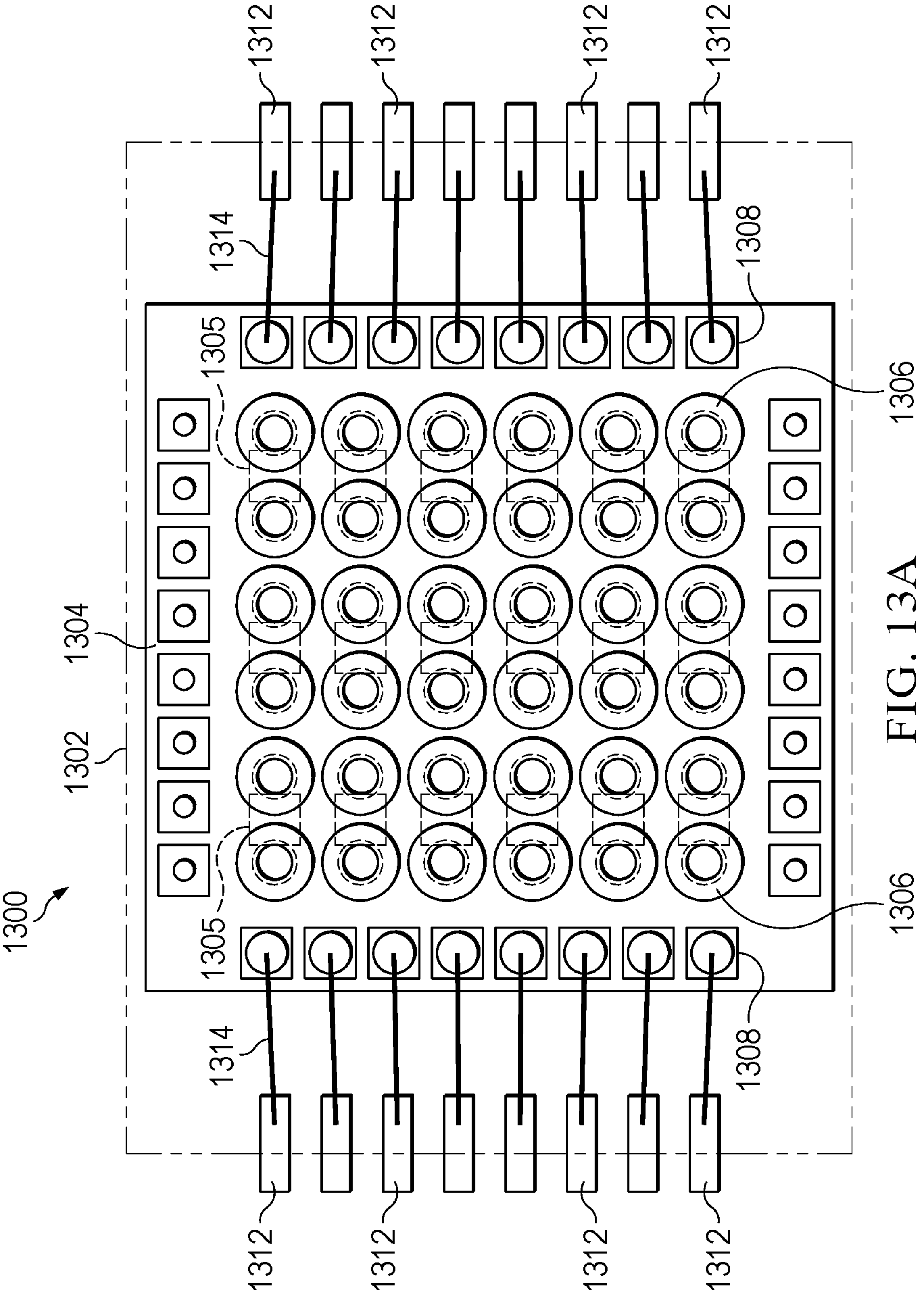
FIG. 13A and FIG. 13B are schematics illustrating, respectively, a top-down view and a perspective view of a sensor package having interfaces for multiple tubes, in accordance with various examples.
Figure 13B:
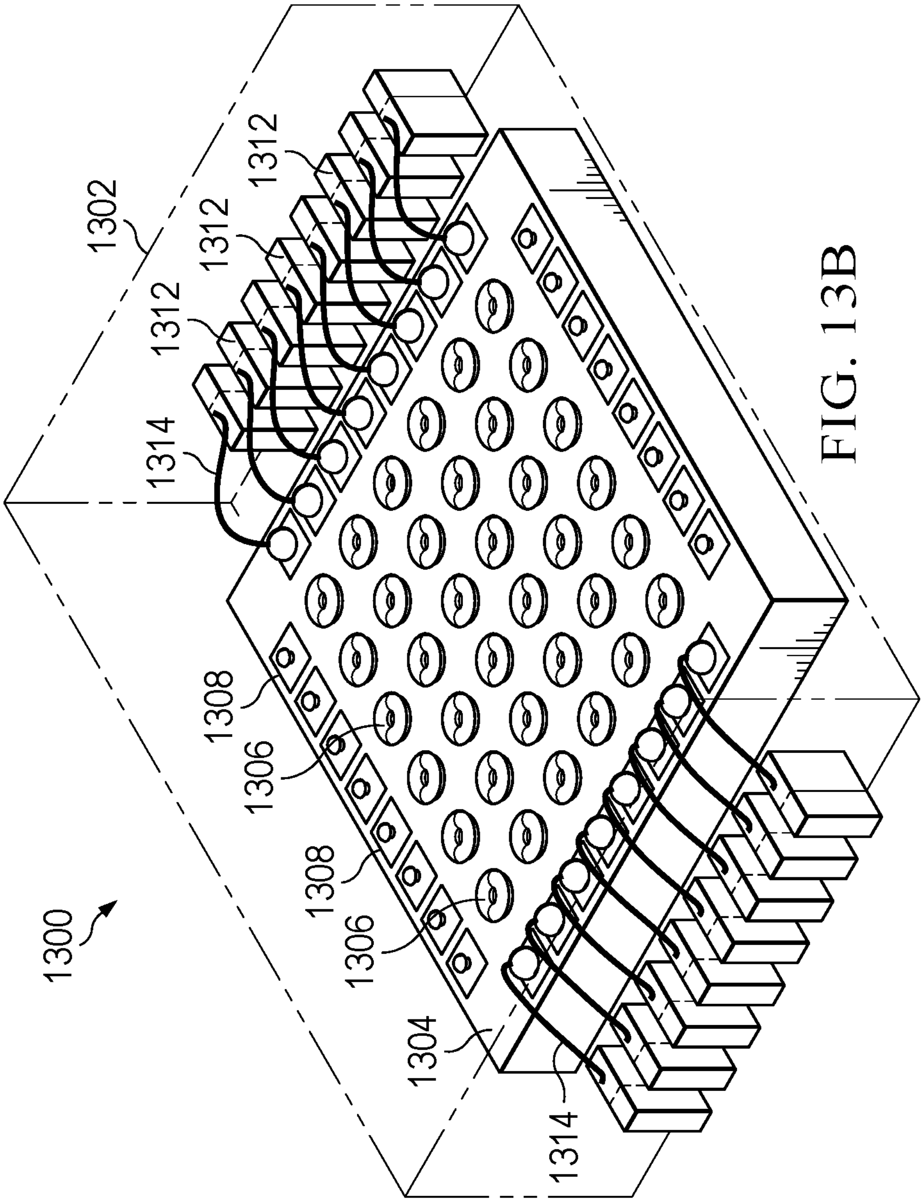

In some examples, a sensor package may include multiple sensors (e.g., multi-dimensional arrays of sensors), each sensor surrounded by its own metal ring(s), and with each metal ring coupled to a tube or cartridge to provide and/or retrieve testing materials from the respective sensor(s). FIG. 13A is a top-down view of a sensor package 1300 having multiple metal rings surrounding multiple sensors and configured to couple to multiple tubes that provide testing material to the sensors, in accordance with various examples. Specifically, the sensor package 1300 includes a mold compound 1302 covering a semiconductor die 1304 that includes an array of sensors 1305 (e.g., similar to the sensor 110) embedded within the die 1304. Each sensor 1305 may be positioned between a pair of metal rings 1306, with one of the metal rings 1306 being configured to provide testing materials (e.g., fluids) to the respective sensor 1305 and the other metal ring 1306 being configured to retrieve testing materials from the respective sensor 1305. By including an array of sensors 1305 and a pair of metal rings 1306 for each of the sensors 1305, and further by coupling separate tubes and/or cartridge fluidic channels to each metal ring, numerous different testing materials may be simultaneously tested. The sensor package 1300 thus provides an efficient technical solution for testing numerous testing materials at a time. The sensor package 1300 includes contact pads 1308 positioned along a perimeter of the die 1304 and conductive terminals 1312 (e.g., leads) positioned along a perimeter of the mold compound 1302. Wirebonds 1314 couple the contact pads 1308 to respective conductive terminals 1312. In some examples, wirebonds 1314 can be replaced with metal posts similar to those of FIGS. 6 and 8 in a flip-chip package. FIG. 13B is a perspective view of the structure of FIG. 13A.

Figure 14:
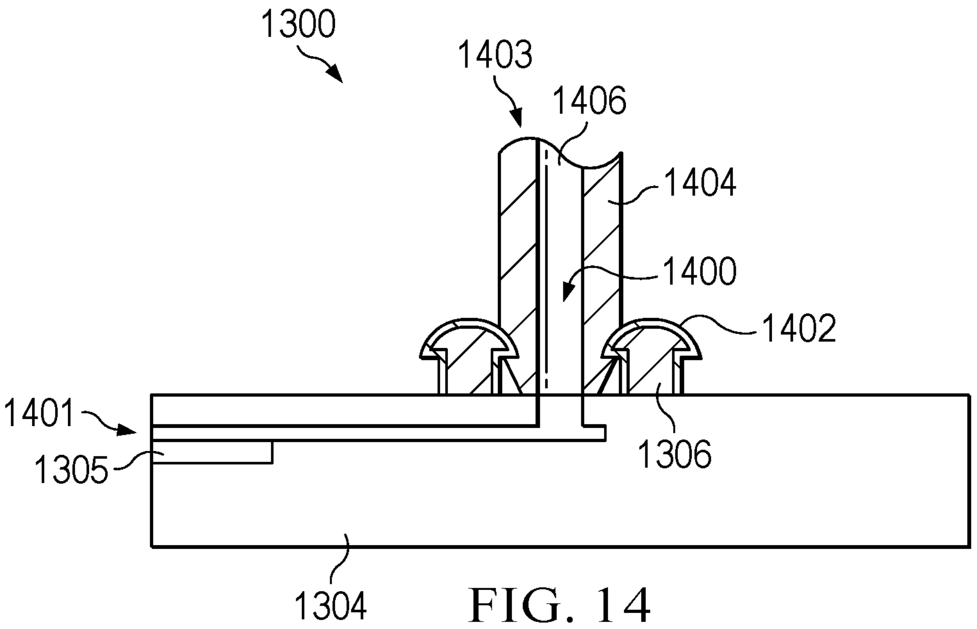
FIG. 14 is a schematic illustrating a profile, cross-sectional view of a portion of the sensor package of FIGS. 13A and 13B, in accordance with various examples.

FIG. 14 is a profile, cross-sectional view of a portion of the sensor package 1300, in accordance with various examples. As shown, the sensor 1305 is embedded within the die 1304 and is fluidically coupled to a cavity 1400 surrounded by the metal ring 1306 via a microfluidic channel 1401. The microfluidic channel 1401 also is fluidically coupled to a cavity surrounded by another one of the metal rings 1306, such as one of the metal rings 1306 shown in FIG. 13A. The metal ring 1306 shown in FIG. 14 is plated with a plated metal 1402 (e.g., a noble metal such as gold). A tube 1403 having a solid portion 1404 and a hollow portion 1406 (e.g., a lumen) is coupled to the metal ring 1306 (e.g., with a plastic prong(s), force fit structure, etc. at the end of the tube 1403 that couples to the metal ring 1306).

In operation, testing materials (e.g., fluids) are provided to the microfluidic channel 1401 by way of the tube 1403. The sensor 1305 senses properties of the testing materials as the testing materials flow through the microfluidic channel 1401. The testing materials then exit the sensor package 1300 via another tube 1403 coupled to an adjacent metal ring 1306. Circuitry in the die 1304 process signals received from the sensor 1305 and provide output signals via wirebonds

1314 and conductive terminals 1312 (e.g., to another device that is coupled to the conductive terminals 1312 by way of metal traces on a PCB).

Figure 15:
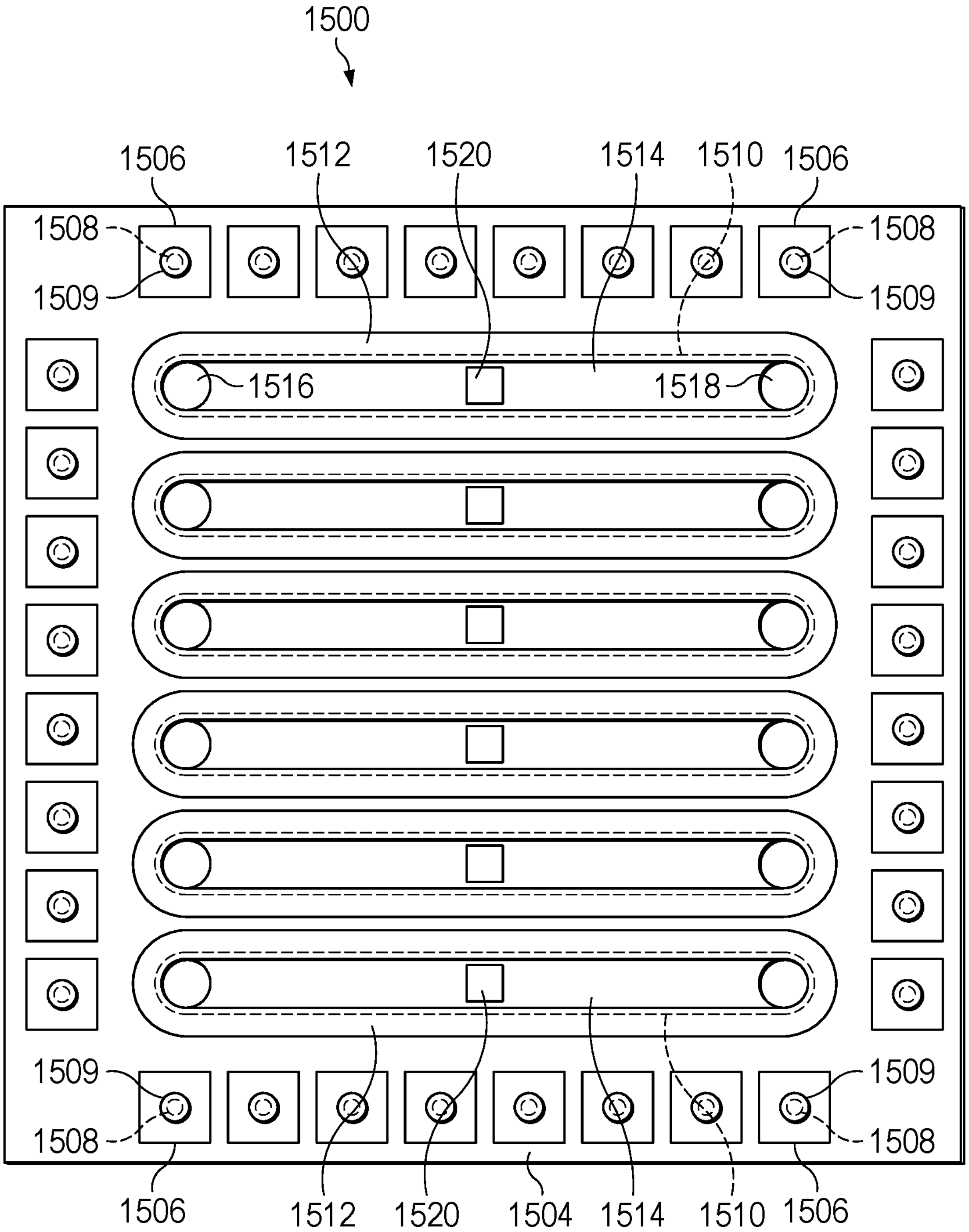
FIG. 15 is a schematic illustrating a top-down view of a sensor package having multiple sensors, in accordance with various examples.
Figure 16:
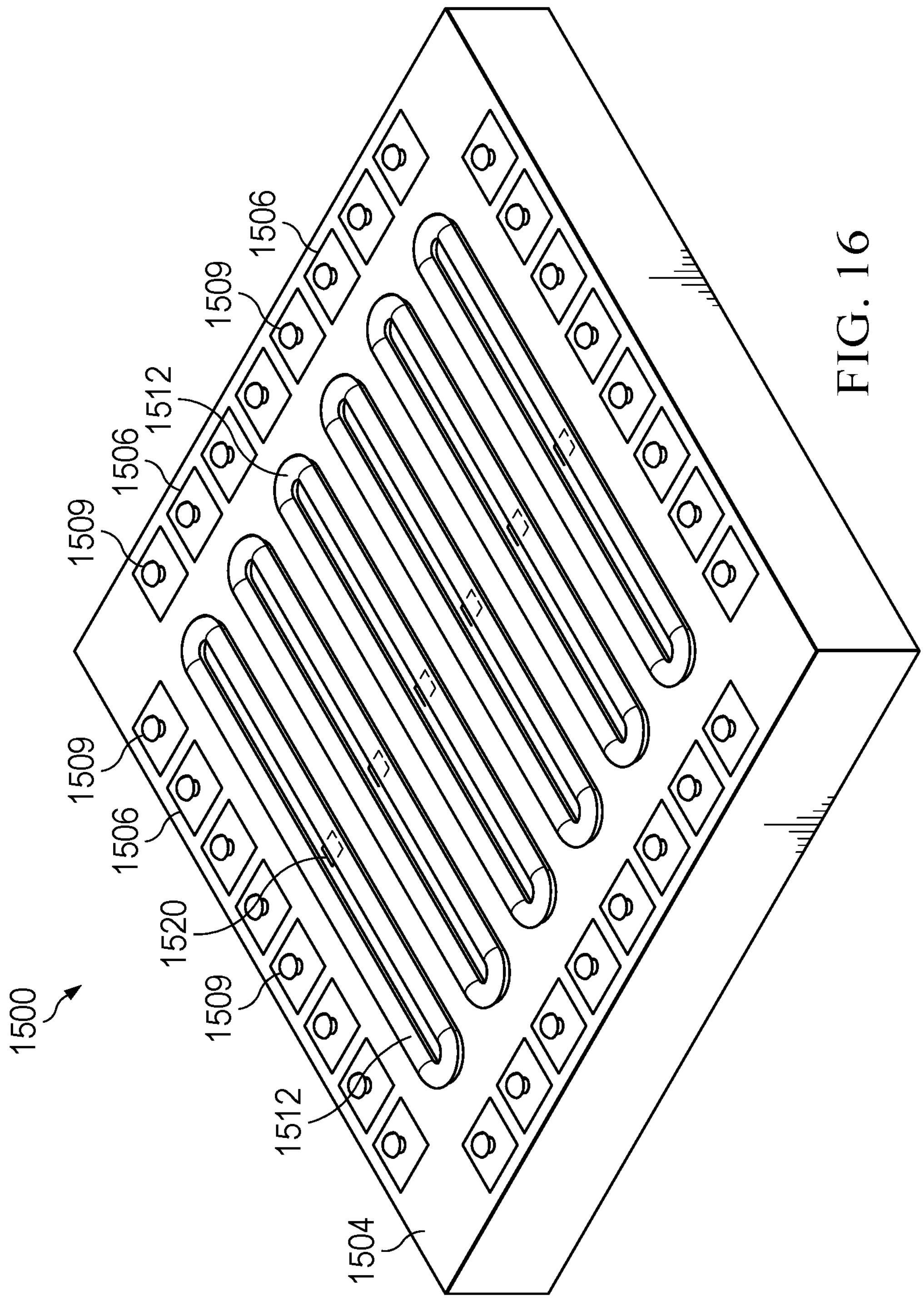
FIG. 16 is a schematic illustrating a perspective view of the sensor package of FIG. 15, in accordance with various examples.

The scope of this description is not limited to packages having circular metal rings. Metal rings may include any of a variety of shapes, such as oblong metal rings. FIG. 15 is a top-down view of a sensor package 1500 having multiple, oblong, metal rings surrounding multiple sensors and configured to couple to a cartridge that provides testing material to the sensors, in accordance with various examples. Specifically, the sensor package 1500 includes a semiconductor die 1504 and contact pads 1506 positioned along a perimeter of the die 1504. At least some of the contact pads 1506 include metal posts 1508 (which may be plated with plated metals 1509 (e.g., noble metals such as gold)) configured to establish electrical pathways to other components, such as cartridges, PCBs, etc., as described below. The metal posts 1508 and the oblong metal rings 1510 may be formed using the photolithographic and plating techniques described below with reference to FIG. 19. The sensor package 1500 includes multiple oblong metal rings 1510 forming cavities 1514 (e.g., fluid channels). The oblong metal rings 1510 may be plated with a plated metal 1512 (e.g., a noble metal such as gold). The cavities 1514 include testing material input areas 1516, testing material output areas 1518, and sensors 1520. In examples, the sensors 1520 are similar to the sensor 110 and thus are not described in detail here. As described below, testing materials (e.g., fluids) are deposited at or near the testing material input areas 1516, sensed by the sensors 1520 as they flow toward the testing material output areas 1518, and are removed from the cavities 1514 at or near the testing material output areas 1518. FIG. 16 is a perspective view of the structure of FIG. 15.

Figure 17:
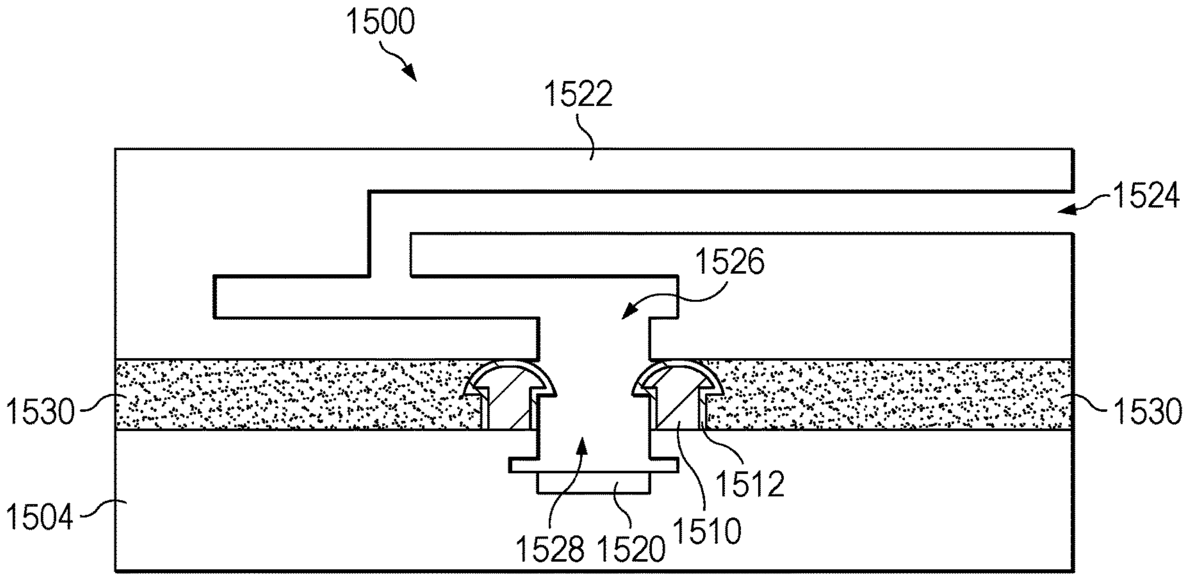
FIG. 17 is a schematic illustrating a profile, cross-sectional view of part of the sensor package of FIG. 15, in accordance with various examples.

As described above, the sensor package 1500 is configured to be coupled to a structure such as a cartridge or tube to receive testing materials. FIG. 17 is a cross-sectional view of the sensor package 1500 coupled to such a structure, in accordance with various examples. The cross-section is taken along the metal ring 1510 and the testing material output area 1518 as shown in FIG. 15. More specifically, the sensor package 1500 is coupled to a cartridge 1522 having a fluidic channel 1524 terminating at a cavity 1526 that interfaces with a cavity 1528 surrounded by the metal ring 1510. The cartridge 1522 may include multiple such fluidic channels 1524 and cavities 1526 that interface with the multiple metal rings 1510 shown in FIG. 15. An adhesive layer 1530 may couple the cartridge 1522 to the sensor package 1500. The sensor 1520 may be positioned within, or adjacent to, a microfluidic channel in some examples.

Figure 18:
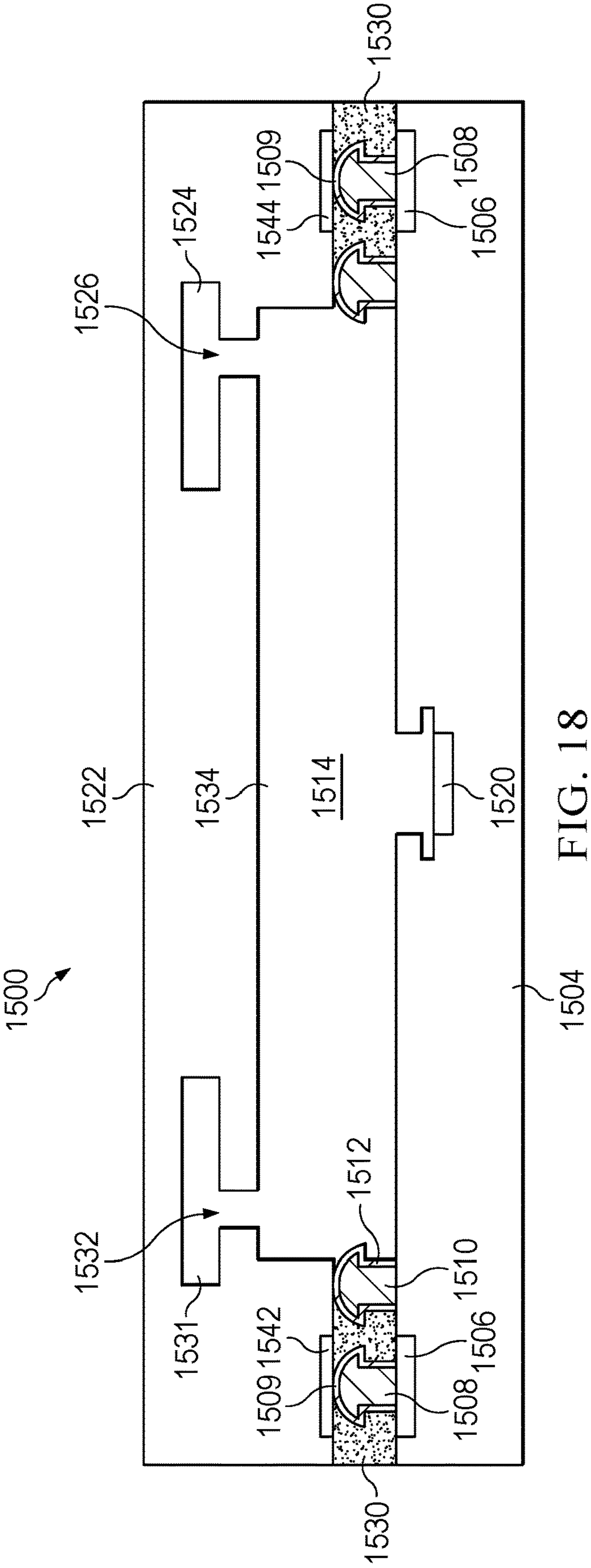
FIG. 18 is a schematic illustrating a profile, cross-sectional view of part of the sensor package of FIG. 15, in accordance with various examples.

FIG. 18 provides another cross-sectional view of the structure of FIG. 15, in accordance with various examples. The cross-section is taken along the metal ring 1510 and the metal posts 1508, as shown in FIG. 15. A fluidic channel 1531 provides testing material (e.g., fluids) to a cavity 1532, which provides the testing material to a fluidic channel 1534. The fluidic channel 1534 interfaces with the cavity 1514 and testing materials flow through the combination of the fluidic channel 1534 and the cavity 1514. As testing materials flow, the sensor 1520 (e.g., which may be located in or adjacent to a microfluidic channel in some examples) detects properties of the testing materials. The testing materials exit through the cavity 1526 and the fluidic channel 1524. Circuitry in the die 1504 receives signals from the sensor 1520 and processes the signals. The circuitry provides signals to metal posts 1508 via contact pads 1506. In turn, the metal posts 1508 provide the signals to metal traces 1542 and 1544 formed on the cartridge 1522. The metal traces 1542 and 1544 may be coupled to other devices or components not expressly shown in FIG. 18.

Figure 19:
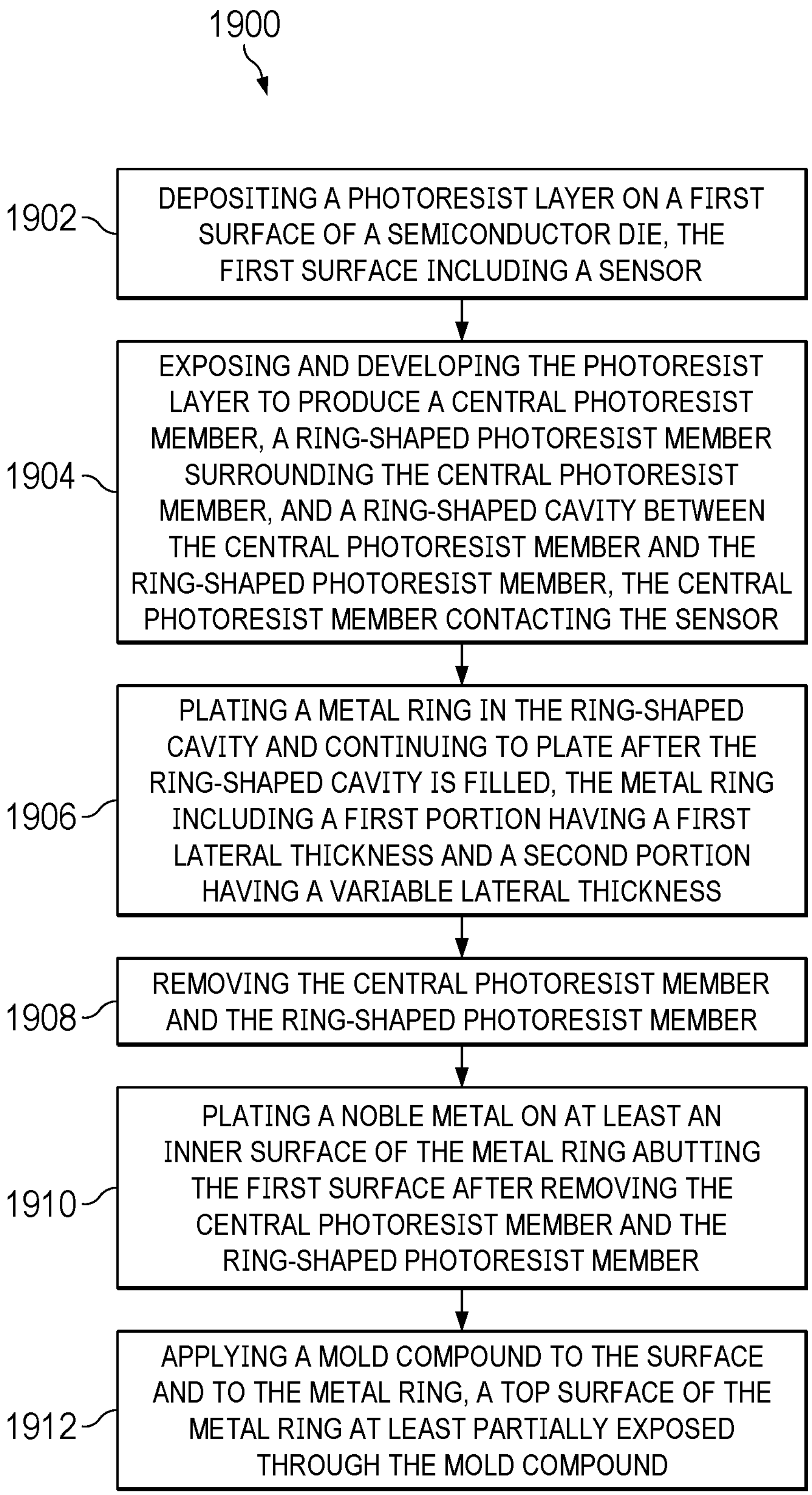
FIG. 19 is a flow diagram of a method for manufacturing a sensor package, in accordance with various examples.

FIG. 19 is a flow diagram of a method 1900 for manufacturing a sensor package having a metal ring configured to couple to a tube that provides a sensor in the sensor package with a testing material (e.g., a fluid), in accordance with various examples. Specifically, the method 1900 includes depositing a photoresist layer on a first surface of a semiconductor die, where the first surface includes a sensor (1902). The method 1900 includes exposing and developing the photoresist layer to produce a central photoresist member, a ring-shaped photoresist member surrounding the central photoresist member, and a ring-shaped cavity between the central photoresist member and the ring-shaped photoresist member (1904). The central photoresist member contacts the sensor (1904). The method 1900 further includes plating a metal ring in the ring-shaped cavity (1906). The plating continues after the ring-shaped cavity has been filled. The metal ring includes a first portion having a first lateral thickness, which is formed by plating within the ring-shaped cavity, and a second portion having a variable lateral thickness, which is formed by continuing to plate after the ring-shaped cavity has been filled (1906). The second portion can form a tapered shape as plating continues, similar to a dome having a flat bottom. The continued plating after the ring-shaped cavity has been filled may continue until the second portion has achieved a target thickness profile. The method 1900 also includes removing the central photoresist member and the ring-shaped photoresist member (1908). The method 1900 comprises plating a noble metal on at least an inner surface of the metal ring abutting the first surface after removing the central photoresist member and the ring-shaped photoresist member and before applying a mold compound (1910). The method 1900 includes applying a mold compound to the surface and to the metal ring (1912). A top surface of the metal ring is at least partially exposed through the mold compound (1912). A technique similar to that described above with reference to FIG. 19 may be useful to form the metal posts 1508 (e.g., FIG. 15). To form such metal posts 1508, the photoresist layer of (1902) is exposed and developed to form a single photoresist member with a cavity, the cavity having an approximately circular horizontal cross-section. The cavity may be positioned over a contact pad 1506. Plating is performed within the cavity to form a first portion of the metal post 1508, and after the cavity is filled, plating may continue to form a second portion of the metal post 1508. Continuing to plate after the cavity is filled naturally results in a dome-shaped second portion having a rounded surface and a flat bottom.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A sensing device, comprising:
- a semiconductor die including a device side and a fluid sensor in the device side;
- a metal ring forming an opening over the fluid sensor, the metal ring having a top surface, a bottom surface, and an inner surface extending between the top surface and the bottom surface, and the bottom surface being on the device side; and
- a mold compound covering the semiconductor die and at least a portion of the metal ring, in which the metal ring provides at least one of a cartridge interface or a tube interface, and the metal ring includes a first portion and a second portion, the first portion closer to the fluid sensor than the second portion, and the second portion having a lateral thickness greater than a lateral thickness of the first portion.

2. The sensing device of claim 1, wherein at least a portion of the inner surface abutting the device side is plated with a noble metal.

3. The sensing device of claim 2, wherein the metal ring comprises copper, and the noble metal comprises gold.

4. The sensing device of claim 1, wherein the second portion has at least a portion protruding out of the mold compound and provides the cartridge interface.

5. The sensing device of claim 4, further comprising a cartridge coupled to the cartridge interface by an insulative adhesive layer, the cartridge including a fluidic channel.

6. The sensing device of claim 5, wherein the metal ring is electrically coupled to a conductive trace on the cartridge.

7. The sensing device of claim 1, further comprising a cartridge coupled to the cartridge interface by an insulative adhesive layer, the cartridge including a fluidic channel.

8. The sensing device of claim 1, wherein the lateral thickness of the second portion decreases in a direction away from the first portion of the metal ring.

9. The sensing device of claim 1, further comprising a tube coupled to the metal ring.

10. The sensing device of claim 1, wherein at least a portion of the inner surface abutting the device side is plated with a first noble metal, and the sensing device comprises:
- a metal post protruding out of the mold compound and plated with a second noble metal and coupled to circuitry of the semiconductor die; and
- a conductive trace coupled to the metal post.

11. The sensing device of claim 10, wherein the metal post includes first and second portions, the first portion of the metal post closer to the semiconductor die than the second portion of the metal post, the first portion of the metal post having a first width, and the second portion of the metal post having a second width larger than the first width.

12. The sensing device of claim 1, wherein the fluid sensor includes an ion-sensitive field-effect transistor (ISFET).

13. The sensing device of claim 1, wherein a horizontal cross-section of the metal ring has an oblong shape.

14. The sensing device of claim 1, wherein a horizontal cross-section of the metal ring has a circular shape.

15. A sensing system, comprising:
- a semiconductor die including a device side and a fluid sensor in the device side;
- a first metal ring forming an opening configured to be in fluidic communication with the fluid sensor, the first metal ring having a first top surface, a first bottom surface, and a first inner surface extending between the first top surface and the first bottom surface, the first bottom surface being on the device side, and at least part of the first inner surface abutting the device side being plated with a first noble metal;
- a second metal ring around the first metal ring, the second metal ring having a second top surface, a second bottom surface, and a second inner surface extending between the second top surface and the second bottom surface, the second bottom surface being on the device side, and at least part of the second inner surface being plated with a second noble metal; and
- a mold compound covering the semiconductor die and a first portion of the second metal ring, in which a second portion of the second metal ring having the second top surface protrudes out of the mold compound.

16. The sensing system of claim 15, wherein the second portion includes a first sub-portion and a second sub-portion, the first sub-portion closer to the fluid sensor than the second sub-portion, the first sub-portion having a first lateral thickness and the second sub-portion having a second lateral thickness that exceeds the first lateral thickness; and
- wherein the first metal ring includes a third portion and a fourth portion, the third portion closer to the fluid sensor than the fourth portion, the third portion having a third lateral thickness and the fourth portion having a fourth lateral thickness that exceeds the third lateral thickness.

17. The sensing system of claim 16, wherein the second lateral thickness is variable and includes thicknesses that exceed the first lateral thickness and that are less than the first lateral thickness.

18. The sensing system of claim 16, wherein the second lateral thickness tapers from a proximal end that is closest to the fluid sensor to a distal end that is farthest from the fluid sensor.

19. The sensing system of claim 15, further comprising a tube including a flange, the flange coupled to the first and second metal rings.

20. The sensing system of claim 15, further comprising a printed circuit board (PCB) including a conductive trace, wherein the conductive trace contacts the second metal ring.

21. The sensing system of claim 15, further comprising:
- a cartridge coupled to the mold compound by an insulative adhesive layer; and
- a conductive material coupled to the first and second metal rings.

22. The sensing system of claim 15, wherein the opening is a first opening, and the sensing system comprises a third metal ring forming a second opening configured to be in fluidic communication with the fluid sensor, in which the third metal ring includes a first portion and a second portion, the mold compound covers the first portion of the third metal ring, and the second portion of the third metal ring having a third top surface that protrudes out of the mold compound.

23. The sensing system of claim 22, further comprising a tube that is coupled to the third metal ring.

24. A method for manufacturing a sensing device, comprising:
- depositing a photoresist layer on a first surface of a semiconductor die, the first surface including a sensor;

exposing and developing the photoresist layer to produce a central photoresist member, a ring-shaped photoresist member surrounding the central photoresist member, and a ring-shaped cavity between the central photoresist member and the ring-shaped photoresist member, the central photoresist member contacting the sensor;

plating a metal ring in the ring-shaped cavity, the metal ring including a first portion having a first lateral thickness and a second portion having a variable lateral thickness;

removing the central photoresist member and the ring-shaped photoresist member;

plating a noble metal on at least an inner surface of the metal ring abutting the first surface; and applying a mold compound to the first surface and to the metal ring, a top surface of the metal ring at least partially exposed through the mold compound.

25. The method of claim 24, wherein plating the metal ring comprises:

performing a plating process to fill the ring-shaped cavity with a plated metal; and continuing the plating process after the ring-shaped cavity is filled with the plated metal.

26. The method of claim 24, further comprising plating the noble metal on the metal ring after removing the central photoresist member and the ring-shaped photoresist member and before applying the mold compound.

* * * * *